United States Patent
Kossat

(10) Patent No.: US 9,651,746 B2
(45) Date of Patent: May 16, 2017

(54) OPTOELECTRONIC DEVICE AND METHOD FOR ASSEMBLING AN OPTOELECTRONIC DEVICE

(71) Applicant: CCS Technology, Inc., Wilmington, DE (US)

(72) Inventor: Rainer Matthias Kossat, Aschau (DE)

(73) Assignee: CCS TECHNOLOGY, INC., Wilmington, DE (US)

( * ) Notice: Subject to any disclaimer, the term of this patent is extended or adjusted under 35 U.S.C. 154(b) by 0 days.

(21) Appl. No.: 14/859,500

(22) Filed: Sep. 21, 2015

(65) Prior Publication Data
US 2016/0011385 A1    Jan. 14, 2016

Related U.S. Application Data

(63) Continuation of application No. PCT/US2014/031669, filed on Mar. 25, 2014.

(30) Foreign Application Priority Data

Mar. 27, 2013  (EP) .................................... 13161425

(51) Int. Cl.
G02B 6/42           (2006.01)

(52) U.S. Cl.
CPC ........... *G02B 6/4239* (2013.01); *G02B 6/424* (2013.01); *G02B 6/4214* (2013.01); *G02B 6/4228* (2013.01); *G02B 6/4245* (2013.01)

(58) Field of Classification Search
None
See application file for complete search history.

(56) References Cited

U.S. PATENT DOCUMENTS 4,092,061 A   5/1978  Stigliani, Jr.
5,163,113 A   11/1992 Melman
(Continued)

FOREIGN PATENT DOCUMENTS

CA    2467400 C  *  9/2011  ............. G02B 6/262
EP    0689071 A1    12/1995
(Continued)

OTHER PUBLICATIONS

Kojima et al., Machine Translation of JP 2010-191123 A, Sep. 2010.*

(Continued)

*Primary Examiner* — Michelle R Connelly

(57) ABSTRACT

An optoelectronic device and a method for assembling an optoelectronic device are provided which obviate the need for providing additional structural elements only for aligning purposes, thus reducing the costs and effort for manufacturing the optoelectronic device. An optoelectronic substrate is mounted on a mounting surface of a mounting substrate; a coupling region of the optoelectronic device faces a reflection element. A fiber endpiece is arranged at a mounting distance from the mounting surface, the mounting distance being larger than a distance of the coupling region from the mounting surface. The mounting surface is exposed and free of any further substrates, layers or structures for mechanically connecting or contacting the optical fiber. A fiber portion which is arranged at a distance from the fiber endpiece contacts a glue droplet arranged on or above the mounting surface of the mounting substrate.

20 Claims, 10 Drawing Sheets

(56) References Cited

U.S. PATENT DOCUMENTS

| | | | | |
|---|---|---|---|---|
| 5,499,312 A | * | 3/1996 | Hahn | G02B 6/4232 385/88 |
| 5,596,664 A | | 1/1997 | Bostica et al. | |
| 9,235,011 B2 | | 1/2016 | Takano et al. | |
| 2003/0012522 A1 | | 1/2003 | Chau | |
| 2004/0208458 A1 | * | 10/2004 | Uno | G02B 6/4214 385/89 |
| 2005/0042795 A1 | * | 2/2005 | Ono | G02B 6/4212 438/64 |
| 2005/0281513 A1 | * | 12/2005 | Choi | G02B 6/4214 385/89 |

FOREIGN PATENT DOCUMENTS

| | | | | |
|---|---|---|---|---|
| EP | 1376178 A2 | | 1/2004 | |
| EP | 2523029 A1 | | 11/2012 | |
| EP | 2713189 A1 | | 4/2014 | |
| EP | 2713193 A1 | * | 4/2014 | G02B 6/4214 |
| JP | 2008185601 A | * | 8/2008 | |
| JP | 2010191123 A | * | 9/2010 | |
| JP | EP 2523029 A1 | * | 11/2012 | G02B 6/4214 |
| JP | 5130731 B2 | * | 1/2013 | |
| WO | 2011041206 A2 | | 4/2011 | |

OTHER PUBLICATIONS

Patent Cooperation Treaty International Search Report, Application No. PCT/US2014/031669, Jun. 11, 2014, 4 pages.

Written Opinion issued in PCT Application No. PCT/US2014/031669 dated Jun. 11, 2014 (7 Pages).

Hak-Soon Lee et al. "Ribbon plastic optical fiber linked optical transmitter and receiver modules featuring a high alignment tolerance". Optics Express 19 (5), 2011, pp. 4301-4309.

* cited by examiner

OPTOELECTRONIC DEVICE AND METHOD FOR ASSEMBLING AN OPTOELECTRONIC DEVICE

PRIORITY APPLICATIONS

This application is a continuation of International Application No. PCT/US14/31669, filed on Mar. 25, 2014, which claims the benefit of priority to European Application No. 13161425.7, filed on Mar. 27, 2013, both applications being incorporated herein by reference.

FIELD

The application refers to an optoelectronic device and to a method of assembling an electronic device.

BACKGROUND

Optoelectronic devices for coupling optical fibers usually comprise, apart from a mounting substrate, such as a printed circuit board, for instance, an optoelectronic substrate having an optoelectronic element, such as a vertical cavity surface-emitting laser (VCSEL), a photodiode, a laser diode, a photodetector or any other element capable of emitting or detecting electromagnetic radiation (for instance visible light or infrared radiation). Optical fibers to be coupled to optoelectronic elements need to be properly aligned with respect to it for ensuring efficient coupling of the radiation propagating between an endpiece of the optical fiber and the optoelectronic element, with minimum loss of radiation. To this end, the optoelectronic device may comprise, apart from the mounting substrate and at least one optoelectronic substrate, further substrates or substrate-like structural elements such as ridges, material blocks, or remaining structures of patterned layers, additionally provided only for the purpose of proper fiber alignment. Accordingly, conventionally connecting the fiber endpiece to achieve proper alignment requires considerable constructional effort. It is desirable to provide an optoelectronic device allowing alignment of the optical fiber with less constructional effort and complexity of the design of the optoelectronic device. It is further desirable to provide a method for more efficiently constructing or at least assembling optoelectronic devices, with less effort for manufacturing the components of the optoelectronic device being assembled.

SUMMARY

Embodiments disclosed are directed to an optoelectronic device and a method of assembling an optoelectronic device.

According to the application, the optoelectronic substrate is mounted with its support surface on the mounting substrate, a coupling region being oriented parallel to the support surface and/or to the mounting surface. The coupling region may for instance form part of an outer top surface of the optoelectronic substrate or of an interior interface surface, that is a boundary surface inside the optoelectronic substrate, for instance of a boundary surface closely beneath the outer top surface. The coupling region thus faces away from the mounting surface of the mounting substrate, in a direction orthogonal, or nearly orthogonal, with a deviation smaller than 15°, and that may be smaller than 10°, to the axial direction of the optical fiber, which extends parallel to the mounting surface. Furthermore, a reflective element is provided for changing the direction of the path of the electromagnetic radiation by approximately or exactly 90°.

The fiber endpiece of the optical fiber is arranged at a distance from the mounting surface being larger than a distance between the coupling region and the mounting surface, and a fiber portion different from the fiber endpiece is immersed in and/or contacts a glue droplet arranged in a fixed position relative to the mounting surface of the mounting substrate. For instance, the glue droplet is glued directly on the mounting surface of the mounting substrate.

According to the application, the mounting surface, with the exception of portions of the mounting surface underlying and supporting the at least one glue droplet and/or the at least one optoelectronic substrate, is exposed around the at least one optoelectronic substrate and/or the at least one glue droplet.

The optoelectronic device thus obviates the need for producing, mounting and/or aligning any further substrates (in addition to the optoelectronic substrate 10, of course), substrate-like or block-like structural elements such as ridges or patterned layers. Such structures or structural elements with precisely positioned contours were conventionally required to additionally abut the fiber endpiece and thereby align it in the desired coupling position enabling proper coupling to the coupling region of the optoelectronic substrate. If the lateral distance along the fiber axis between the fiber endpiece and the fiber portion contacting the droplet is sufficiently small, the fiber endpiece does not need to be mounted at the optoelectronic substrate and may instead be held in an aligned position and orientation only by means of the glue droplet on the optoelectronic substrate; no effort some alignment of further substrates, or substrate-like or block-like structural elements such as ridges or patterned layers being required. Accordingly, the optoelectronic device of the application is easier and less costly to produce.

According to the application, also a method of assembling an optoelectronic device is provided which reduces the time and effort needed for manufacturing or at least assembling the optoelectronic device.

BRIEF DESCRIPTION OF THE DRAWINGS

Exemplary embodiments are disclosed herein with respect to the figures and which show.

DETAILED DESCRIPTION

Figure 1:
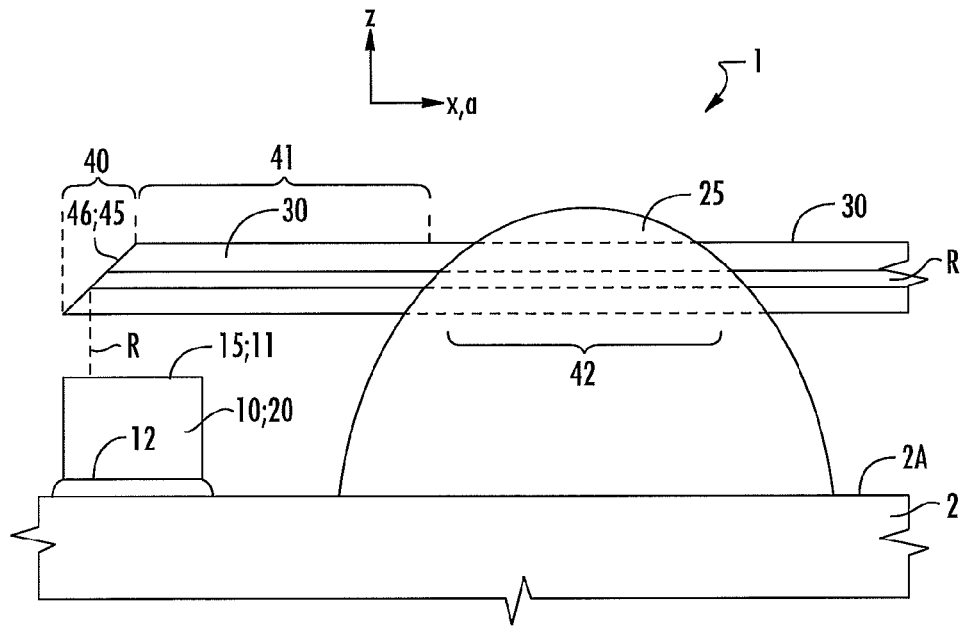
FIG. 1 is a schematic cross-sectional view of an embodiment of an optoelectronic device.

FIG. 1 shows a schematic cross-sectional view of one exemplary embodiment of the optoelectronic device 1. The optoelectronic device 1 comprises a mounting substrate 2 such as a printed circuit board or a glass substrate, a quartz substrate, a ceramic substrate, a synthetic substrate (such as a polymer substrate) or a semiconductor substrate (such as a silicon substrate), for instance. In addition, however, the optoelectronic device 1 comprises at least one optoelectronic substrate 10, such as a semiconductor substrate, a glass substrate, a quartz substrate, a ceramic substrate or a synthetic substrate (such as a polymer substrate, for instance). In case of a semiconductor substrate, the mounting substrate 2 may be a silicon substrate or a substrate comprising one or more layers of binary, ternary and/or quaternary III-V-semiconductor materials. Silicon may particularly be used as a semiconductor material for transmission of infrared radiation with wavelengths above 1000 nm. Each optoelectronic substrate 10 comprises at least one optoelectronic element 20 capable of emitting or detecting electromagnetic radiation R that may be in the range of visible light, in infrared or in the ultraviolet frequency range. The optoelectronic element 20 for instance is a VCSEL (vertical cavity surface-emitting laser), a photodiode, a laser diode, a photodetector or any other optoelectronic element, particularly a surface-emitting element or surface-detecting element comprising a coupling region 15 which may be arranged at or closely below a surface of boundary surface of the optoelectronic substrate 10 or may even be arranged inside the optoelectronic substrate 10. The coupling region 15 may for instance form a top surface 11 facing away from the mounting substrate 2, whereas a support surface 12 of the optoelectronic substrate 10 is supported by and/or mounted at the mounting surface 2A, for instance by means of a thin adhesive film. The coupling region 15 and/or the top surface 11 is parallel, or approximately parallel, with a deviation of up to 15° at maximum, to the support surface 12 and/or the mounting surface 2A of the mounting substrate 2.

In the application, the optical fiber 30 encompasses any fibers usable for transmission of electromagnetic radiation, be it visible light as in case of a glass fiber, or be it radiation invisible to the human eye, such as infrared or ultraviolet radiation.

Figure 2:
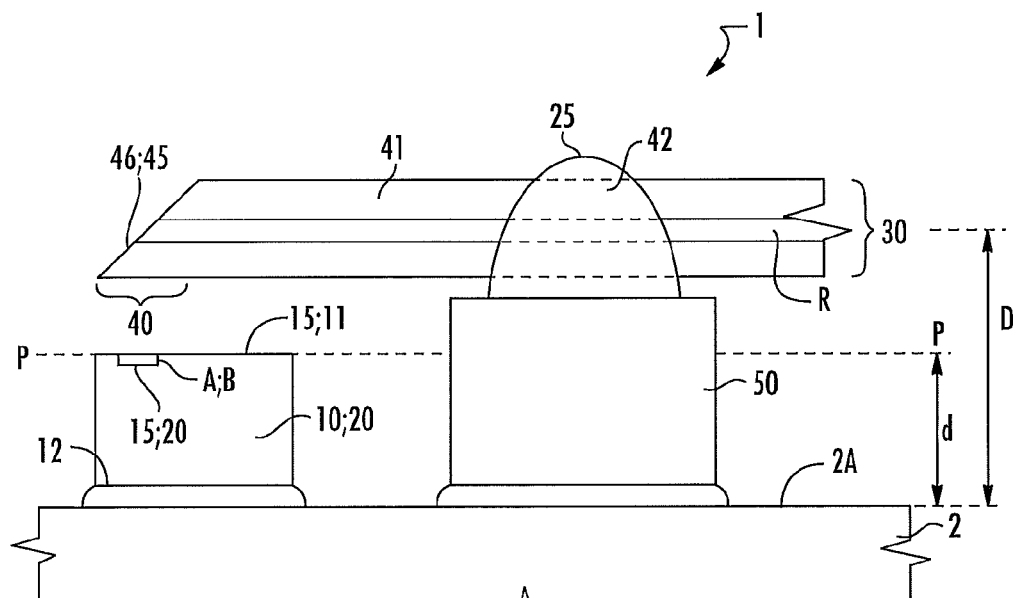
FIG. 2 is a cross-sectional view of an alternative embodiment of an optoelectronic device.
Figure 6:
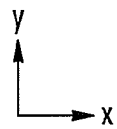
FIG. 6 is a top view on a top surface of an optoelectronic substrate showing one optoelectronic element and one the fiber endpiece arranged above the optoelectronic substrate.
Figure 6:
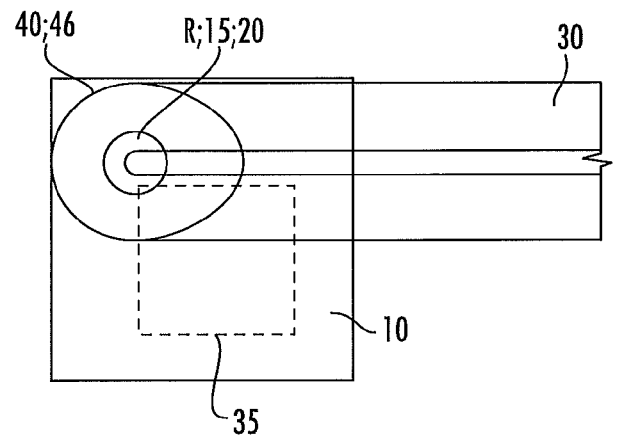

In the cross-sectional view of FIG. 1 spanned by a first lateral direction x and a vertical direction z above the mounting surface 2A of the mounting substrate 2, at least one optical fiber 30 is to be coupled to the optoelectronic substrate 10 so as to enable propagation of electromagnetic radiation R between them. Along a second lateral direction y, plural optical fibers may be provided for coupling to plural optoelectronic elements 20 of one and the same optoelectronic substrate 10. Moreover, two or more optoelectronic substrates 10 may be provided on the mounting surface 2A, each one provided for coupling one or plural optical fibers. Each optical fiber comprises a fiber endpiece 40 to be arranged in an aligned coupling position with respect to the coupling region 15 of the electronic substrate 10 so as to enable communication using electromagnetic radiation between them. The coupling region 15 may for instance be an active area of an optoelectronic element 20 arranged at or closely below a top surface 11 (or interface surface 5, as described later) of the optoelectronic substrate 10. The top surface 11 thus may include the coupling region 15 which, however, may represent only or extend at only a small surface portion of the top surface 11, as indicated in FIG. 2 or 6.

The optoelectronic device 1 further comprises a reflective element 45 for reflecting the radiation intended to travel between the coupling region 15 of the optoelectronic substrate 10 and the optical fiber 30. As apparent from the embodiment of FIG. 1, the reflective element 45 may for instance be a reflective fiber surface 46 arranged at the fiber endpiece 40. The reflective element 45 or fiber surface 46 may be planar or curved and may have a main orientation inclined relative to the axial direction a. The inclination angle between the optical axis of the optical fiber 30 and the normal direction of the reflective fiber surface 46 or reflective element 45 is between 40° and 60°, such as about 45° or between 50° and 55°. The reflective element 45 or reflective fiber surface 46, respectively, may thus be oriented to allow total internal reflection, for instance on the inside of the fiber endpiece 40. Although other angles are possible, the reflective fiber surface 46 or reflective element 45 may be oriented at an angle of exactly 45° relative to the optical fiber axis in case that non-total, partial reflection of at least 85% of light intensity is sufficient for an acceptable coupling efficiency.

The optoelectronic device 1 further comprises at least one glue droplet 25. At least one or two droplets per each optical fiber 30 may be used, for instance. The at least one glue droplet 25 is fixed in its position relative to the mounting surface 2A of the mounting substrate 2. In FIG. 1, the glue droplet 25 is directly glued on and thereby attached to the mounting surface 2A. The glue droplet 25 is made of a glue material or any other adhesive material. A resist material being UV-curable or curable by laser radiation. The laser radiation may be generated by a CO2-laser, for instance. When connecting an optoelectronic substrate 2 and an optical fiber 30 to one another, epoxy resin, or acrylate, is usable as adhesive material; these materials may likewise be used for forming the droplets 25 shown in FIG. 1. However, there should be a considerable difference in the refractive index (of at least ±0.3, and may be at least ±0.6) between the droplet 25 and the optical fiber 30 in case that the glue droplet 25 is contacting the radiation-transmissive fiber directly. For instance, the difference between the refractive indices of the glue droplet and of the optical fiber may be between ±0.3 and ±0.6, or even larger. The same amount of difference in the refractive index may be chosen for any other embodiment of the application. Alternatively, the first fiber portion 42 which contacts the glue droplet 25 may be a coated fiber portion, without requiring any adjustment of the refractive indices. The coating of the fiber thus may surround the first fiber portion 42 and may also surround a part of the first fiber section 41, whereas the fiber endpiece 40 and a part of the first fiber section 41 are uncoated and thus exposed to the ambient atmosphere. In case the first fiber portion 42 is coated, the glue droplet 25 contacts the coating of the fiber but does not necessarily contact the radiation-transmissive fiber surrounded by the coating.

By the way, the optical fiber may comprise a fiber core as well as a fiber cladding surrounding the fiber core. The core and the cladding may combined constitute the radiation-transmissive optical fiber 30, and no fiber coating need to be around them. Alternatively, the optical fiber 30 may include a coated fiber region as well as an uncoated fiber region; and all claims, figures and further embodiments of the application may encompass both above alternatives as well as those described below. In case of an at least partially coated fiber, for instance, the first fiber portion 42 may form part of the coated fiber region or, alternatively, of the uncoated fiber region.

As an example, the diameter of the coated fiber may be 250 µm including the coating and 125 µm without the coating. The fiber cladding may have a diameter of 125 µm and the fiber core may have a diameter of up to 80 µm, for instance. However, for high-frequency applications, the fiber core diameter may be as small as between 10 and 25 µm. However, any numerical values throughout the application are only exemplary. By the way, the coupling region 15 may have a diameter of about 30 µm, for instance.

In FIG. 1 as well in all other Figures, claims and embodiments of the application, a fiber coating may be present around the optical fiber 30. Furthermore, the fiber coating may surround the first fiber portion 42 and, optionally a part of the first fiber section 41. In the FIG. 1 and the further figures, the fiber coating is not explicitly illustrated for easier illustration. The radiation-transmissive material of the optical fiber is then surrounded by the fiber coating. In particular, in the (first) fiber portion 42 of the optical fiber 30, the fiber coating surrounding the radiation-transmissive material of the optical fiber (rather than the radiation-transmissive material itself) may contact the glue droplet. However, the entire fiber still is surrounded by the material of the glue droplet and/or immersed in it. In the case of an uncoated first fiber portion 42, the radiation-transmissive material itself may contact the material of the glue droplet. If the optical fiber has a coating, the axial end of the coating is around the first fiber section 41 that is at an axial position between the fiber endpiece 40 and the first fiber portion 42 contacting, immersed in or surrounded by the glue droplet 25.

The droplet 25 is not only initially provided but also permanently maintained in the shape of a drop or droplet and thereby keeps an overall curved or bulging shape of its outer, exposed surface, such as a semi-spherical surface, a semi-elliptical surface or any other curved and/or bulging surface shape, exposed to the ambient atmosphere like air, which is not confined by interface surfaces to other objects or components of the optoelectronic device, with the exception of the optical fiber 30 contacting it and the underlying mounting surface 2A of the mounting substrate 2 supporting the glue droplet 25. The exposed outer surface of the at least one glue droplet 25 is for instance formed like a distorted semi-sphere; its cross-sectional view in FIG. 1 being distortedly semi-circular.

As apparent from FIG. 1, a first fiber portion 42 of the optical fiber 30 contacts the glue droplet 25. The first fiber portion 42 is surrounded by the glue droplet and/or is immersed in the glue droplet. Thereby, the at least one glue droplet 25 may be used to exactly position the fiber endpiece 40 in a coupling position aligned to the optoelectronic substrate 10. The first surface portion 42 in contact with the glue droplet is connected to the fiber endpiece 40 by a first fiber section 41 exposed to the ambient atmosphere. The axial length of the first fiber section 41 is less than 3 mm, and may be less than 2 mm. Provided a sufficiently short length of the first fiber section 41, that is distance between the fiber endpiece 40 and the first fiber portion 42, sufficient alignment of the fiber endpiece is thus achievable by the one, two or more glue droplets exclusively, even in case that no additional aligning structure is provided between the fiber endpiece and the optoelectronic device as in FIG. 1. Thereby, the effort and costs for achieving proper alignment during assembly of the optoelectronic device 1 usually involving in the use of lead frames, sub-boards, or substrate-like or block-like structures or elements are eliminated. In order to ensure proper alignment, only one fiber contacts each respective glue droplet 25, thus enabling independent alignment of each fiber endpiece 40 separately.

Regarding the design of the fiber endpiece 40, FIG. 1 and all other embodiments of the application are merely exemplary. For instance, the reflective element 45 need not be a reflective surface integrated in the fiber endpiece 40 of the optical fiber 30, and it does not need not be planar bus may be spherically or otherwise curved, particularly with a focussing curvature such that the curved reflective element 45 has a focal distance, along a non-axial direction different from the fiber's axial direction, and serves to focus light or infrared or UV radiation emitted by, or to be detected by, the respective optoelectronic element 20. In case of a reflective fiber surface 46, it may be a cleaved, particularly laser-cleaved surface of the fiber material. Of course, the reflective fiber surface 46 may also be a polished fiber surface rather than a cleaved one. The main orientation, that is the average or overall orientation, of the reflective fiber surface 46 or other kind of reflective element 45 may be at an inclination angle as described above. The main orientation may, for instance, be measured at the point of intersection of the optical axis of the fiber and the reflective fiber surface 46 or the reflective element 45, respectively. Although not explicitly shown in FIG. 1, the optoelectronic substrate 10 is not only mechanically mounted, but also electrically connected to the mounting substrate 2, for instance by using soldering structures, bond wires and/or other kinds of bonding or soldering structures, or by using electrically conductive epoxy resin for gluing the optoelectronic substrate 10 onto the electrical contacts of the mounting substrate 2. Thereby, contact structures of the optoelectronic substrate 10, for instance of at its top surface 11, sidewalls and/or support surface, may be connected to the electrical contacts of the mounting substrate 2.

Apart from the reflective element 45, further structures or specially shaped surface portions may be provided at the fiber endpiece 40. For instance, the fiber endpiece 40 may be provided with a thickened, spherical, distortedly spherical or otherwise two-dimensionally curved surface other than the cleaved or otherwise shaped or flattened reflective fiber surface 46. Particularly, a surface portion of the fiber endpiece opposed to the reflective fiber surface 46 that thus faces the optoelectronic substrate 10 may be provided with a two-dimensional curvature, thus forming a focussing lens. Generally, any shape of the fiber endpiece 40 providing a turn of the optical light path by 90° or approximately 90° (±10°) may be provided, thus allowing coupling to any optoelectronic substrate and optoelectronic element that emits or receives electromagnetic radiation mainly to or from the normal direction of its upper surface or active area.

At the same time, the optical fiber 30 may be oriented in parallel or parallel, along the most part of its length, across the mounting surface 2A of the mounting substrate 2.

In contrast to conceivably conventional designs, according to FIG. 1 no further substrates, patterned layers, ridges, or other substrate-like structural elements (requiring vertical as well as lateral patterning or shaping of their exterior surfaces) are required, apart from the optoelectronic substrate 10 itself, for coupling of the fiber endpiece 40 to the optoelectronic substrate 10. Accordingly, the constructional effort is minimized compared to conceivable arrangements including further substrates or structural elements to be aligned with respect to the optical fiber and/or to the optoelectronic substrate.

FIG. 2 shows a further embodiment whose differences compared to FIG. 1 are explained in the following. Those features not explicitly addressed herein below may be realized in like manner as explained above for the embodiment of FIG. 1; the same applies to any further figure and/or embodiment throughout the application.

According to FIG. 2, the at least one glue droplet 25 is connected to and thereby fixed in its position relative to the mounting substrate 2 via a support block 50 which may be made of ULTEM or any other kind of material, such as an injection molding material. The tolerances of the dimensions and/or positions of the support block 50 are not critical; they are in the range of 50 µm or even above. The support block 50 forms a pedestal which increases the height of the support surface or support level for the respective droplets 25, thereby reducing the required amount of glue material, resin material or other kind of adhesive material of the droplet 25. At least one droplet 25 for at least one optical fiber 30 directly adheres to the top surface of the respective support block 50. The support block 50 may be glued onto the mounting surface 2A in like manner as the optoelectronic substrate 10. Along the second lateral direction perpendicular to the drawing plane of FIG. 2, a plurality of glue droplets 25 may be provided on the same support block 50 for supporting a plurality of optical fibers. Again, only one fiber portion 42 of one respective fiber 30 contacts the respective glue droplet 25, due to independent adjustment. Alternatively, below each glue droplet 25 a separate respective support block or pedestal 50 may be provided, each of them individually glued on the mounting surface 2A. In comparison with FIG. 1, the embodiment of FIG. 2 helps reduce the amount of droplet material for each droplet 25. Moreover, the lateral cross-section or diameter of each glue droplet 25 is reduced compared to FIG. 1, thus allowing laterally denser arrangements of plural optical fibers 30 which may be arranged and individually aligned next to one another along a second lateral dimension y. As a further benefit, pre-hardening the droplet material prior to alignment or final alignment of the fiber endpiece 40 is expedited by the smaller droplet 25 compared to FIG. 1.

As in FIG. 1, the mounting surface 2A of the mounting substrate 2 may be exposed to the ambient atmosphere or air everywhere outside the at least one glue droplet and the at least one optoelectronic substrate. The exposed mounting surface 2A in particular is a main surface of the mounting substrate having its normal direction facing the at least one glue droplet and the at least one the optoelectronic substrate. Accordingly, apart from the surface portions of the mounting surface needed and/or covered with for the optoelectronic substrate 10 and the at least one glue droplet 25 or its pedestal, the remaining surface portion of the mounting surface 2A is permanently exposed, that is uncovered with any further substrates, layers or structures which would mechanically connect, contact or support the optical fiber. In particular, the remaining surface portion of the mounting surface 2A surrounding the footprint of the least one optoelectronic substrate 10 and the footprint of at least one glue droplet 25 is free of any further support means or alignment means for supporting and/or aligning further end pieces to the at least one optoelectronic substrate. Accordingly, as such additional mounting means are absent; they need not be aligned with respect to the fiber endpiece and/or to the optoelectronic substrate.

Figure 7:
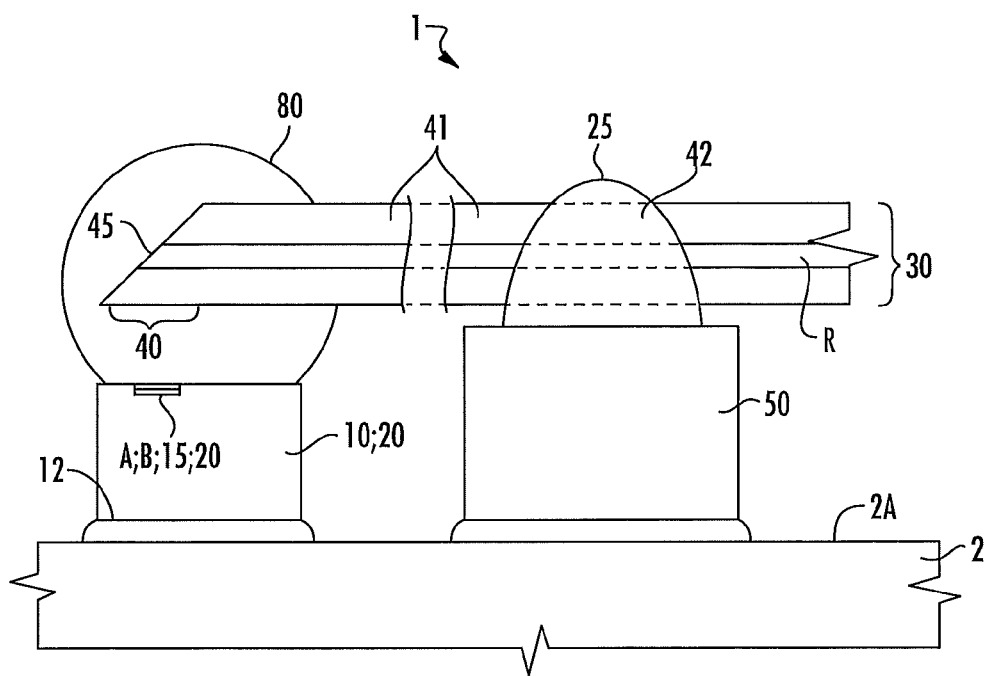
FIG. 7 is a cross-sectional view of an embodiment of an optoelectronic device similar to FIGS. 1 and 2 with a fiber endpiece additionally secured to the optoelectronic substrate.

As shown in FIG. 1 and explicitly indicated in FIG. 2, the fiber endpiece is arranged at a mounting distance D from the mounting surface 2A, which mounting distance D is larger than the distance between a position p of the coupling region 15 of the optoelectronic substrate 10 and the mounting surface 2A; the distance of the coupling region 15 from the mounting surface 2A thus being smaller than the mounting distance D as given by the optical fiber axis. In FIGS. 1 and 2, the coupling region 15 for instance is a surface portion of the top surface 11 of the optoelectronic substrate 10, the optoelectronic element 20 accordingly being provided at or closely below the top surface 11. As indicated in FIG. 2 or 7, for instance, and likewise combinable with any other embodiment of the application, the optoelectronic element 20 may comprise a stack of optoelectronically active layers A, B stacked on one another and arranged or in the optoelectronic substrate 10. Alternatively, only one optoelectronically active layers A, may suffice. The coupling region 15 may, for instance, be a boundary surface 5 of the stack of optoelectronically active layers A, B or may be a boundary surface, or exposed surface, of at least one optoelectronically active layer A. The coupling region 15 is an active area capable of emitting or detecting electromagnetic radiation propagating mainly along the normal direction orthogonal to the extension of the coupling region 15. The same may be true for the stack of optoelectronically active layers A, B. The coupling region 15, the at least one optoelectronically active layer A, B and/or the optoelectronic element 20 as a whole may be arranged at an outer surface of the optoelectronic substrate 10, such as the top surface 11, or closely below such an outer surface, for instance at the depth from the surface smaller than 100 µm or, alternatively, deeper on the inside of the optoelectronic substrate 10.

According to the embodiments of FIGS. 1 and 2, the coupling region 15, with its two main directions of extension defined by the layers, is oriented such as parallel to the top surface or exposed surface of the optoelectronic substrate 10. Additionally or alternatively, the coupling region 15 may be oriented parallel to and thus extend parallel to the support surface 12 of the optoelectronic substrate 10 and/or parallel to the mounting surface 2A of the mounting substrate 2. The above features regarding the orientation and location of the coupling region may likewise be realized for any other figure or embodiment of the application. However, these features need not be facultative.

Figure 3:
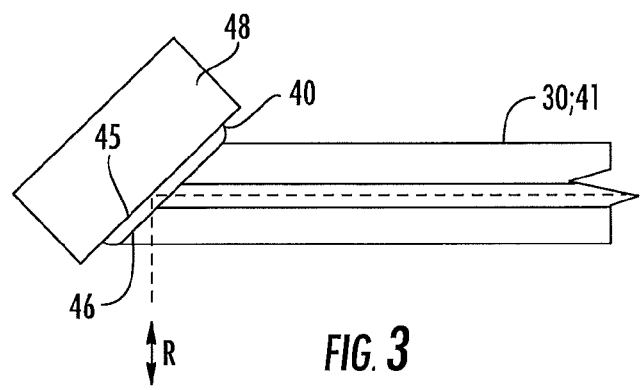
FIG. 3 is an embodiment of the optoelectronic device with the reflective element included in the fiber endpiece.
Figure 4:
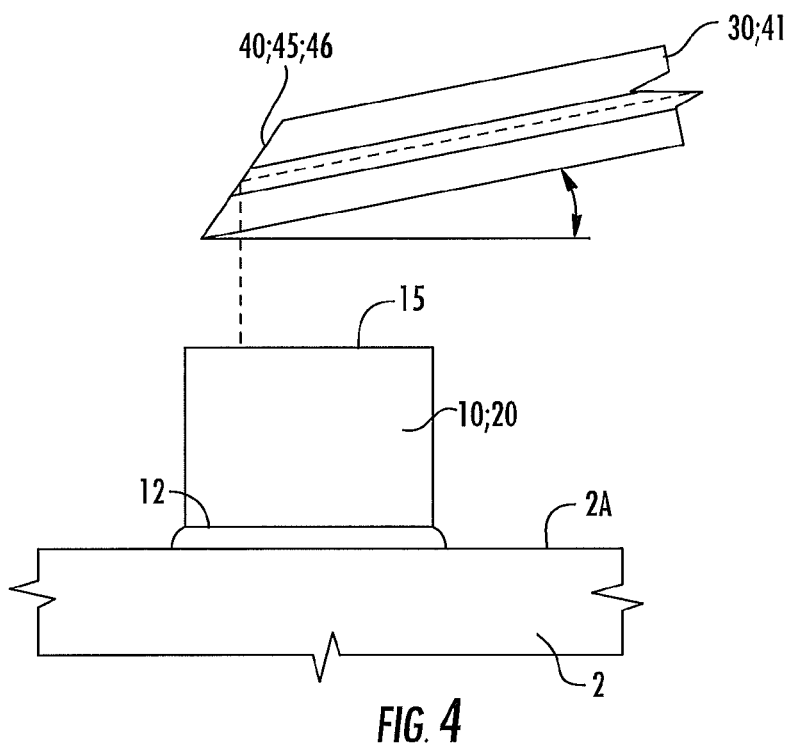
FIG. 4 is a further embodiment of an optoelectronic device with an inclined fiber endpiece.

FIGS. 3 and 4 show two partial cross-sectional views of embodiments for improving coupling efficiency. According to FIG. 3, the optical fiber 30, including its first fiber section 41 closest to the fiber endpiece 40, extends along a first lateral direction x collinear or parallel to the mounting surface 2A of the mounting substrate 2; see FIG. 1 or 2. The reflective element 45 is an interface surface of a reflective material block 48 which is glued, by means of an optically transparent glue material or otherwise mounted, to the inclined fiber surface 46. Alternatively to the reflective material block 48, a reflective coating (for instance as a gold layer or dielectric system layer sprayed or otherwise coated onto the inclined fiber surface 46 of the fiber endpiece 40) may be arranged on the inclined fiber surface. The inclined fiber surface 46, whether being reflectively coated or transparent, for instance when in contact with an optically transparent resin, may be oriented at exactly 45° with respect to the optical axis, or may be oriented between 50° and 55° so as to allow total internal reflection in the fiber.

According to FIG. 4, the optical fiber 30 or at least its distal, first fiber section 41 (carrying the fiber endpiece 40 comprising the reflective fiber surface 46 or reflective element 45) may be oriented in a slightly tilted orientation compared to the direction exactly parallel to or collinear with the extension of the mounting surface 2A of the mounting substrate 2. Thereby an inclination angle of the reflective element 45 up to 15° away from the optical axis of the fiber 30 may be realized without conflicting with the direction of light propagation to or from the coupling region 15 of the optoelectronic substrate 10, which direction of propagation is intended to be the direction substantially normal of the coupling region 15 and/or to the mounting substrate 2.

Figure 5:
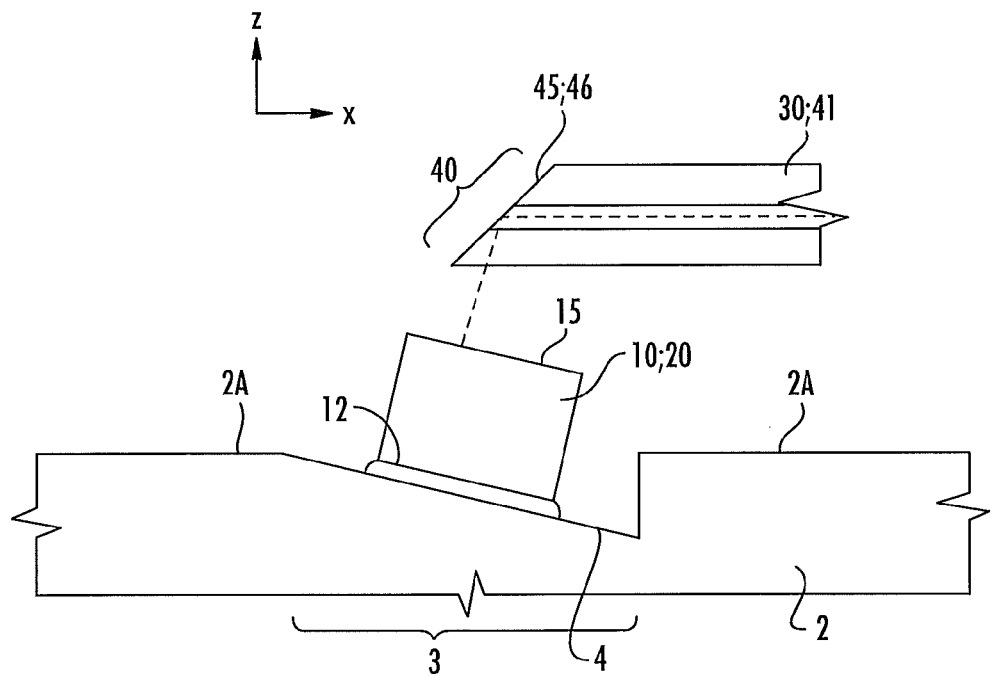
FIG. 5 is an embodiment of an optoelectronic device with a recess in the mounting surface of the mounting substrate.

According to the embodiment of FIG. 5, the mounting surface 2A includes a recess 3 comprising a bottom surface 4 which is recessed and/or slanted relative to the surrounding portion of the mounting surface 2A. Accordingly, also the optoelectronic substrate 10 is slanted or tilted relative to surrounding mounting surface 2A, thus achieving light propagation to or from the coupling region in a direction not exactly perpendicular to the mounting surface 2A, but slightly tilted or inclined relative to the normal direction, that is the vertical direction z of the surrounding mounting surface 2A by an angle suitable for total internal reflection in the fiber endpiece 40. Accordingly, the fiber endpiece 40 may comprise a totally reflective fiber surface 46 having an inclination angle larger than 45° from the optical fiber axis. The recess may be formed by etching, for instance.

FIG. 6 shows a partial top view on the top surface of an optoelectronic substrate 10, such as the top surface 11 in FIGS. 1 to 5, with at least one optoelectronic element 20 and one fiber endpiece 40 arranged above it. As indicated schematically in FIG. 6, the lateral extensions of the coupling region 15 of the optoelectronic substrate 10 are much smaller than those of the entire outer surface or top surface 11 which faces away from the mounting substrate 2 and faces the fiber endpiece 40. Thus the coupling region 15 is a partial surface section of the exterior top surface, or of another exterior surface or even of an internal interface surface or boundary surface closely below the top surface 11 or deeper inside the substrate 10. As indicated in FIG. 6, the coupling region 15 may, for instance, be a circular or otherwise laterally contoured, active area of the respective optoelectronic element 20. As indicated by the dashed line, the optoelectronic element 20 may comprise further surface sections in addition to the actual active area 15 from or to which the electromagnetic radiation R propagates. In the exemplary embodiment of FIG. 6, showing a top view on a VCSEL being the optoelectronic element 20, the element 20 may further comprise a quadratic or otherwise contoured contact structure such as a bond pad. The coupling region 15 is an optoelectronically active emitter surface, for instance. In FIG. 6, the coupling region 15 is significantly smaller than the lateral extensions of the entire optoelectronic substrate 10 along the directions x, y. The coupling region 15 has a circular contour and is laterally offset in both lateral directions from the center of the top surface of the optoelectronic surface 10. In this case, the fiber endpiece 40 is to be aligned in a position likewise laterally offset in both directions x, y from the center of the top surface 11. The optoelectronic device partially depicted in FIG. 6 can be realized according to any embodiment of the application. Of course, the optoelectronic element of FIG. 6 can be a photodiode or any other optoelectronic element rather than a VCSEL. Thus the coupling region 15, rather than being an active area surface of a VCSEL or of another kind of radiation-emitting device, may likewise be a light-sensitive surface of a photo diode.

The optoelectronic substrate 10 and the fiber endpiece 40 may be fixed to one another in an aligned position by means of a drop or layer of adhesive 80 as indicated for instance in FIG. 7; see below. When approaching the fiber endpiece 40 towards the coupling region 15 in FIG. 6, such as by gripping and then guiding or otherwise moving the optical fiber 30 along the normal direction n of the coupling region 15, the adhesive 80 may already be applied between them or may be applied later. The adhesive 80 may be an optical adhesive transparent for the wavelength to be emitted or detected by the optoelectronic element 20, for instance epoxy resin or acrylate. Curing and thereby hardening of the adhesive 80 may be executed using exposure to UV-radiation or thermally by exposure to laser light, for instance of a CO2-laser. Curing of the adhesive 80 according to one of FIGS. 1 to 6 may be performed partially prior to, partially subsequently to positioning and/or aligning the fiber endpiece 40 with respect to the coupling region 15. Thus, a first step of pre-curing may be performed directly after a drop or layer of an adhesive 80 is attached to the coupling region 15. Final curing may be performed later after the fiber endpiece 40 is brought in contact with the adhesive 80. The adhesive 80 has a refractive index corresponding to that of the optical fiber, for instance with a difference in refractive index of 0.2 at maximum. The adhesive 80 ensures the preservation of a proper alignment and mechanical stability and, in comparison with a gap of air having to be bridged, reduces the divergence of light in the gap, thereby increasing coupling efficiency.

FIG. 7 shows an embodiment in which the optoelectronic substrate 10 and the fiber endpiece 40 are fixed to one another in an aligned position by means of a drop of adhesive 80. The adhesive 80 may surround and encapsulates the fiber endpiece 40, including the reflective element 45, namely the reflective surface. If the adhesive 80 abuts the reflective surface directly without any reflective layers or coatings between them, the refractive indices of the fiber material and of the adhesive 80 should differ from one another by at least ±0.3, and may be by at least ±0.6.

Figure 8:
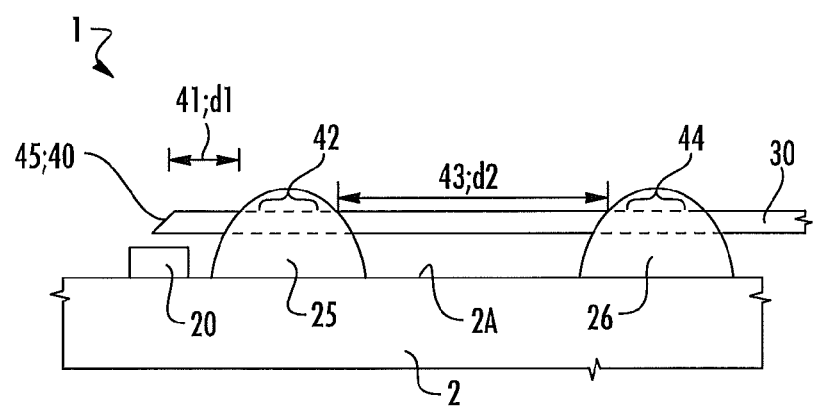
FIG. 8 is an embodiment similar to FIGS. 1, 2 and 7.

FIG. 8 shows an embodiment comparable to FIGS. 1, 2 and 7 but with an additional, second glue droplet 26 which is contacted by a second fiber portion 44. The second fiber portion 44 is connected to the first fiber portion 42 by a second fiber section 43 which may additionally be guided in like manner as the fiber section 41, as explained above.

Figure 9:
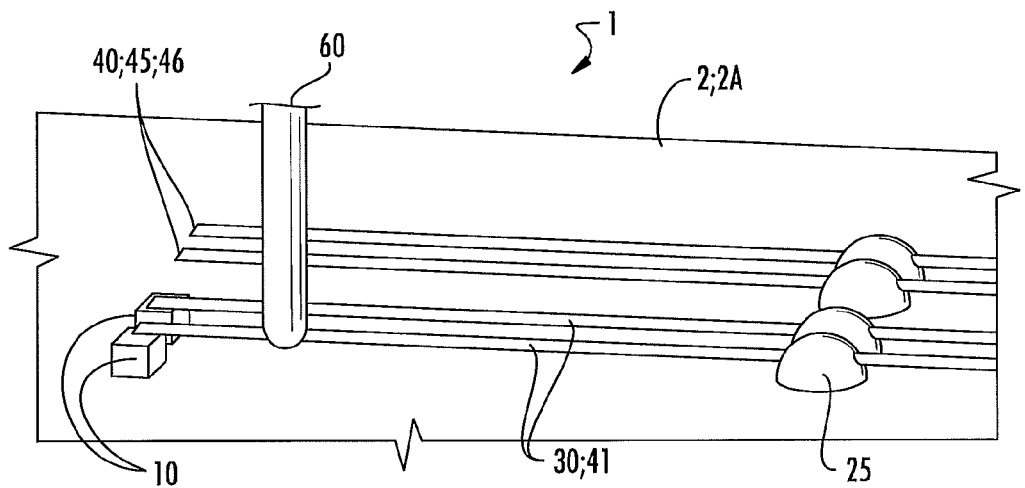
FIGS. 9 to 11 are perspective views of the mounting surface the mounting substrate of the optoelectronic device during assembly; with tools such as fiber grippers being additionally shown.

FIG. 9 shows a perspective view of the mounting surface 2A illustrating one of the steps of assembling the optoelectronic device 1. According to one embodiment, before or after having mounted one or plural optoelectronic substrates 10 on the mounting surface 2A (only two optoelectronic substrates being shown in FIGS. 9 and 10 for easier illustration), the fiber endpieces are first coupled to the optoelectronic substrates 10 before the glue droplets 25 are applied and the optical fibers are brought into contact with them. Alternatively, the optical fibers can be brought into contact with the glue droplets 25 first, before coupling the optical fibers to the optoelectronic substrates 10.

The glue droplets 25 may be applied directly to the mounting surface 2A or, alternatively, may applied to a support block (not illustrated), such as a substrate, ridge or a fin of any material. The support block does not need to comprise any electric or optoelectronic components, and it does not need to be positioned or aligned more precisely than with a tolerance of about 50 micrometers. The support block just serves as a pedestal between the droplet and the mounting surface 2A to elevate the underground surface under the glue droplet. The step of applying the glue droplets 25 can be executed before, concurrently with or even after mounting the substrates 2, 10 to one another.

Figure 10:
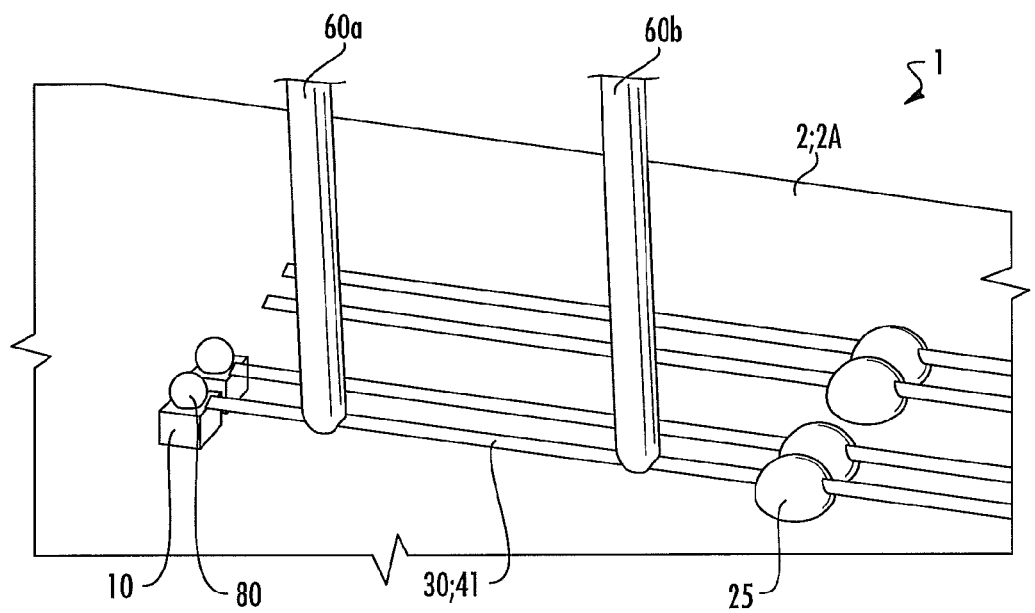

Regardless of the specific consecutive order sequence of steps chosen, according to FIG. 9 each fiber may be guided, positioned and/or coupled to the coupling region 15 of the respective optoelectronic substrate 10 by means of one or plural grippers 60 which may grip the fiber at a distance of between 1 and 10 mm from the fiber endpiece, for instance. The gripper 60 may be an air suction gripper, such as a vacuum gripper. The lower end of the gripper is formed to receive an optical fiber. By underpressure, that is negative pressure compared to the ambient atmosphere exerted through a suction tube within the gripper 60, the fiber is gripped by the gripper 60 so as to be guided or moved in order to accomplish proper positioning and/or alignment. FIG. 9 shows only one gripper 60 holding one optical fiber 30 at its first fiber section 41, at a gripping spot closer to the fiber endpiece 40 than to the fiber portion 42 contacting or to be brought into contact with the glue droplet 25 or at least immersed in the droplet 25, such that the fiber portion 42 and/or a fiber coating around it is surrounded by the material of the glue droplet 25. The fiber endpieces 40 are to be aligned with the coupling regions 15 and may also be secured to the coupling regions 15. To this end, as depicted in FIG. 10, a respective drop or layer of adhesive 80 may be applied to the surface of the optoelectronic device on or in which the coupling region 15 is provided, and/or to the fiber endpieces 40. The adhesive 80 shown in FIG. 10 may be applied before or, alternatively, after positioning and/or aligning the wafer endpieces 40. Furthermore, the adhesive 80 may be hardened or cured in one step or in plural steps, for instance comprising a first pre-curing step which may be executed after or even before alignment. A final hardening step for completing the hardening process is then performed only after proper alignment has been accomplished. If only one hardening step is executed, it is likewise executed after alignment has been accomplished.

According to FIGS. 9 and 10, one single gripper 60 or a pair grippers 60a, 60b, or any other number of grippers may be used for achieving alignment of each respective fiber. In particular, predetermined fiber bending may be achieved using at least two grippers 60a, 60b, for instance for slightly retracting a fiber endpiece 40 from the coupling region 15 before finally fixing it thereto, for instance by applying or at least finally hardening the adhesive 80. Retraction of the fiber endpiece 40 may be particularly beneficial to provide more margin of the optical fiber against mechanical stress caused thermally, particularly against tensional stress exerted during operation. Tensional stress may result in case that the mounting substrate 2, at temperatures higher than the ambient temperature during assembly of the optoelectronic device 1, expands stronger than the optical fiber, due to a larger temperature expansion coefficient of the printed circuit board compared to the optical fiber. An intentionally designed, artificial curvature or bend in the course of the optical fiber, particularly of its first fiber section 41, may compensate for such potential tensional forces without compromising a mechanically safe connection between the fiber endpiece and the substrate 10. Of course, mounting of the optical fiber 30 may also be performed at a mounting temperature higher than the room temperature to provide additional margin, in particular at a temperature above the intended operation temperature of the optoelectronic device. Whatever the mounting temperature selected, the intended fiber bend or fiber curvature may be realized at least in a region of the first fiber section 41 between the first glue droplet 25 and the fiber endpiece 40.

According to one embodiment, one or plural droplets are applied and a fiber portion 42 contacts them at an axial position corresponding to a distance between the substrate 10 and the fiber endpiece 40 which distance is smaller than a final target distance. Subsequently, the first fiber section 41 is bent, for instance using the two grippers of FIG. 10, thus positioning the fiber endpiece at its target distance. The curved or bended shape or course of the first fiber section 41 slightly deviating from the first lateral direction x (which corresponds to the normal direction of the coupling region 15) may comprise deviations along the directions y and/or z. Only deviations along one of these directions are realized. If two separate grippers 60a, 60b (as in FIG. 10) are used, both grippers can be offset from the centered fiber position in the same direction, for instance along the direction y or z. The amount of the deviation of the gripper 60b closer to the glue droplet 25 than the other gripper 60a is chosen larger than the deviation of the other gripper 60a closer to the fiber endpiece 40.

Figure 11:
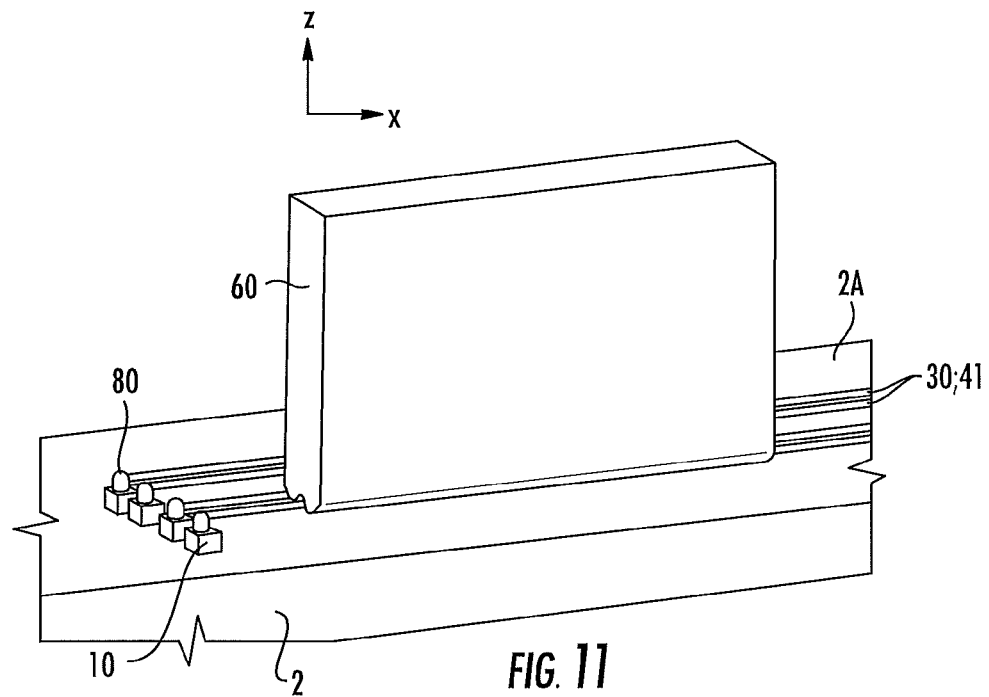

FIG. 11 illustrates the step of guiding, positioning and/or aligning at least one optical fiber 30 using an alternative gripper 60 extending along a larger part of the length of the first fiber section 41. Along the axial direction the gripper 60 has an elongate extension of at least 2 to 6 mm. Plural air suction tubes 61 may be provided within the gripper 60, for extending vertically downwards. Additionally, or alternatively, the tubes or channels may at least locally be connected to one another. At the gripping end at the bottom of the gripper 60, a plurality of at least two, such as more than five air suction openings 62 are provided for holding the fiber at different gripping spots along its length. The one gripper 60 of FIG. 11 may thus suffice for properly positioning, aligning and optionally retracting the fiber section 41. In any of the FIGS. 9 to 16, the bottom surface of the gripper may have a substantially cylindrical surface portion in which the one or plural air suction holes 62 are provided; the radius of the curvature of the cylindrical surface will correspond to the diameter of the optical fiber 30. The bottom surface of the gripper may also include a slightly deviating, non-linear shape so as to provide an additional curvature or bend of the fiber along its gripped length when being gripped and thus held. The bottom surface of the elongate gripper 60 may thus comprise an overall curvature along one of the directions y, z such that at least one or some of the air suction holes is or are offset in their position from the axial center line of the fiber. Whereas the illustrated embodiments depict grippers for gripping one single respective fiber, a gripper 60 can also comprise plural bottom surface portions for holding a plurality of fibers. Thereby a number of fibers may be aligned at the same time and in parallel to one another, especially when all these fiber endpieces 40 to be gripped have already been aligned and/or secured to the substrate 10 before. Referring to FIGS. 10 and 11, the same order of steps may be chosen as explained above with regard to FIG. 9, for instance. Generally, it is advantageous to align and fix the fiber at the substrate first, before fixing the first portion 42 by means of the at least one blue droplet 25. This ensures that the fiber endpiece 40 and/or the portion of the first fiber section 41 closest to it is oriented exactly orthogonally or perpendicularly to the coupling region 15 of the optoelectronic substrate 10, that is along the normal direction n of the coupling region 15.

Whereas FIGS. 9 to 11 show solder structures, any kind of contact structure 16 may be applied instead. Furthermore, a VCSEL, a photodiode or any other optoelectronic element 20 may be comprised inside and/or outside the optoelectronic substrate. The coupling region 15 may form part of a top surface 11 of the actual chip or wafer piece constituting the optoelectronic substrate 10. As the substrate 10 is mounted on the mounting substrate 2 in an orientation turned by 90° compared to an orientation in which the main surface of the substrate 10 (which is a chip or a former wafer piece) would be coplanar to the mounting surface 2A, the former top surface 11 now forms a sidewall of the substrate 10, when mounted at the mounting surface 2A.

Figure 12:
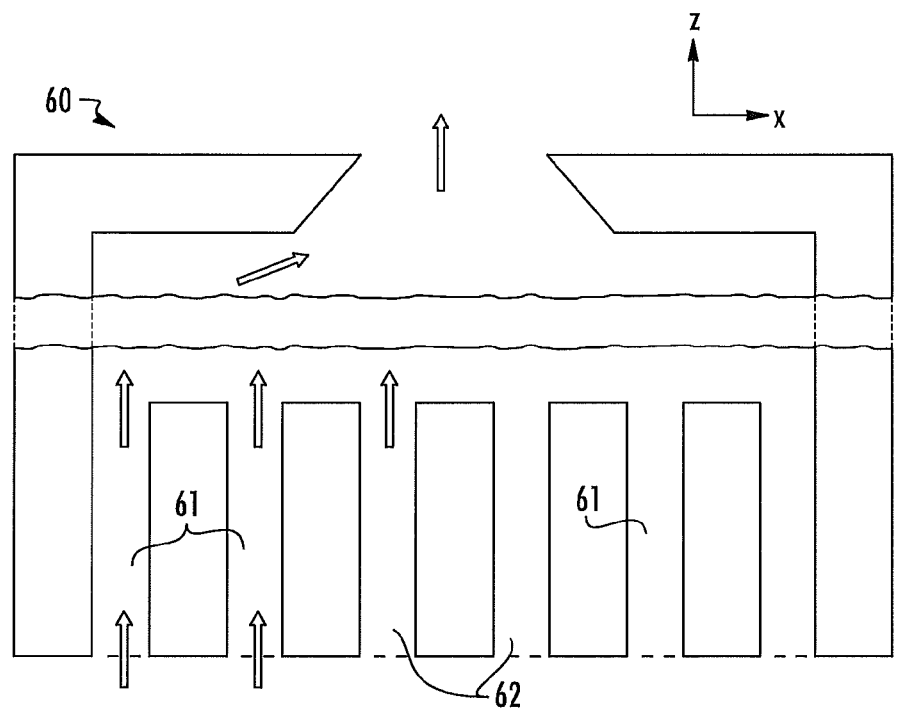
FIG. 12 is a cross-sectional view through a center plane of the gripper shown in FIG. 11.

FIG. 12 shows a cross-sectional view through the center of the gripper 60 of FIG. 11 along the directions x and z, thus revealing where the air suction tubes 61 may for instance extend. Along the elongate extension x of the gripper 60, a plurality of air suction holes 62 is provided at the bottom surface, and air suction tubes 61 extend above them. The air suction tubes 61 may be linked with one another at an upper part of the gripper 60 as shown in FIG. 12. An upper end of the gripper is connected to a tool generating a vacuum or sub-pressure lower than the ambient atmospheric pressure. Each of the air suction holes 62 may be circular and the tubes 61 may be tubular in cross-section in the plane spanned by the directions x and y. The tubes 61 may be realized by micro-bores or by micro-patterning in at least one of the halves of the gripper 60 before both halves are mounted together. For instance, FIG. 12 may show the inner surface of the first half of the gripper arranged below the drawing plane, whereas another half, either shaped analogously or shaped without any openings or bores at all, would be provided above the drawing plane when connected to the first half Anyway, FIG. 12 shows a cross-section of the entire gripper 60 roughly through its center with regard to the direction y. In the example of FIG. 12, the plural bores or channels may be bores, slits or other kinds of recesses within the gripper 60. An appropriate system for micro-positioning and micro-aligning the optical fibers will be used in connection with the one or plural grippers 60 of one of FIGS. 9 to 12 for guiding, positioning and/or aligning the fiber. Whereas in FIG. 12 the suction holes 62 are all in the same vertical position, the suction holes 62 may alternatively be positioned at different vertical positions, and the outermost suction holes 62 may be along the direction x being arranged at a low vertical position, whereas those suction holes 62 at the center of the gripper 60 along the direction x are arranged at higher vertical positions. Accordingly, the length of the outermost suction holes 62 may be longer, due to the vertical position of the outermost suction holes 62. Thereby a vertical bend of the gripped fiber or fiber portion is obtained, which bend may provide for additional margin of the optical fiber against mechanical and/or tensional stress caused thermally.

Figure 13:
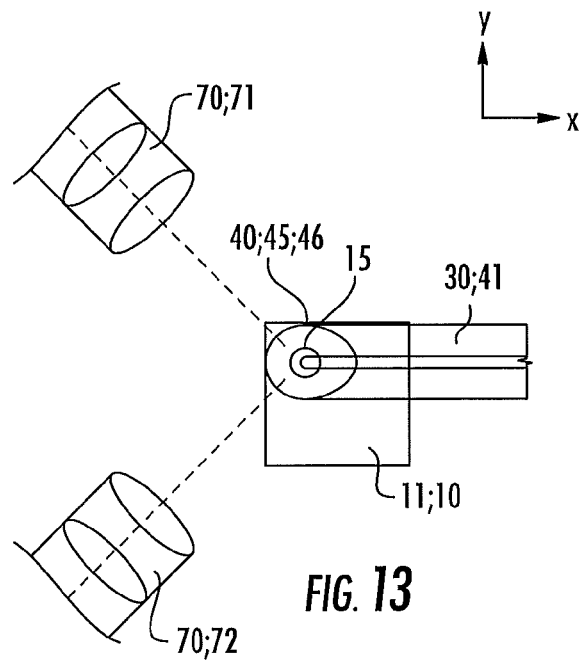
FIG. 13 is a cross-sectional side view illustrating an exemplary embodiment of a method of assembling the optoelectronic device, particularly regarding the step of positioning and/or aligning the optical fiber.

FIG. 13 shows a cross-sectional view illustrating a step of positioning and/or aligning an optical fiber relative to the optoelectronic substrate using monitoring equipment. The monitor equipment at least comprises one or plural camera systems 70, 71, 72, such as two video camera systems or photo camera systems, for observing both the fiber endpiece 40 and the coupling region 15. Optionally, at least one mirror may additionally be provided (not shown) and, for instance, attached a gripper 60 closest to the fiber endpiece (see FIG. 15 or 16); this allows easier monitoring without getting the camera system 70 in the way of the gripper 60. However, monitoring can also be done without using mirrors. As illustrated in FIG. 13, a viewing axis of the at least one video camera system 70 is, for instance, directed to one of the coupling regions 15 of the optoelectronic substrate 10. If it contains plural coupling regions 15, for each coupling region a monitored alignment step may be executed; and can be independent for each optical coupling region 15 or for each optical fiber 30, respectively. The optical system may comprise a photographic and/or a video camera, such as a CMOS camera or a CCD camera), as well as a lens system, and produces an image on a photo or video sensor, thus obtaining a control image for monitoring the coupling region 15 and/or of the fiber endpiece 40 as they are guided so as to approach one another. The guidance or positioning of the optical system, at least of the camera system 70, may for instance be performed by first positioning it such that the surface of the optoelectronic element (such as a VCSEL or a photodiode) or at least of its coupling region 15 is arranged in or near the focus plane so as to create a sharp image of it. Alternatively, in case that the camera system 70 is to be moved together with the gripper 60 and the fiber 30, the focus plane of the optical system is first laid on the fiber endpiece 40, for instance. Two separate photo or video camera systems 71, 72 are used for observing the interspace between the optoelectronic element 20 and the fiber endpiece 40 from different directions. Thereby, the three-dimensional relative positions of the coupling region and the fiber endpiece may be calculated more precisely. According to FIG. 13, both camera systems 71, 72 may have an orientation inclined with regard to the axial direction x and relative to the second lateral direction y.

Figure 14:
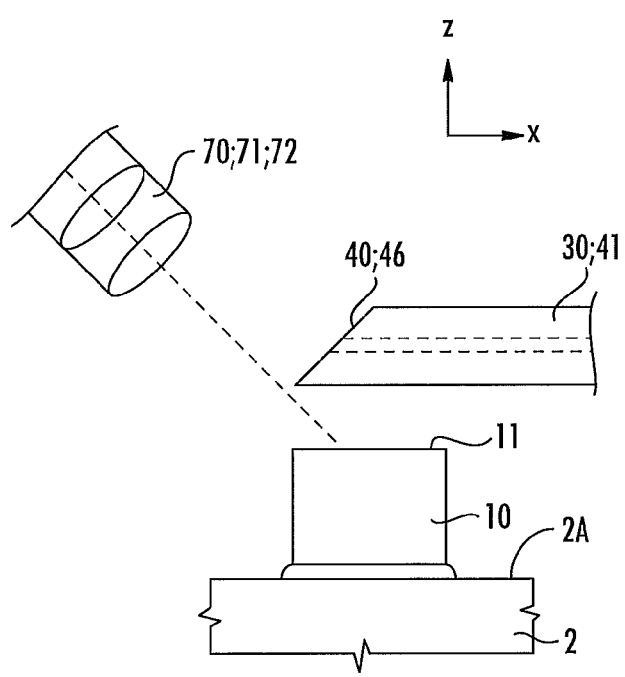
FIG. 14 is a schematic top view related to the method, using a pair of camera systems.

Additionally, as shown in FIG. 14, the orientation of the camera systems 70 may be inclined relative to the vertical direction z. If two separate camera systems 71, 72 are used, they can be arranged on opposed sides of the fiber, i.e. from positions displaced along the positive and negative direction y as shown in FIG. 13 in top view. Both camera systems 70 are oriented such that they are at least roughly directed towards the interspace between the fiber endpiece and the coupling region. However, additionally a mirror may be provided, as in FIG. 15 or 16, for instance, within the optical path of the camera systems 70.

It is to be noted that the top surface 11 of the optoelectronic substrate 10, which comprises the optoelectronic element, may be larger, even much larger than the optoelectronic element 20 or coupling region 15 that is arranged on or beneath. Accordingly, the lateral extensions of the optoelectronic element 20, in the directions x and y, may be much smaller than the extensions of the surface 11 of the optoelectronic substrate 10 along the directions x and y. Furthermore, the dimensions along the directions x and y of the coupling region 15 (represented by an active area, for instance) may be much smaller than the lateral extensions of the optoelectronic element 20 as a whole. Although not depicted in the Figures, the lateral extensions of the coupling region 15 may be a tapered fiber endpiece 40, thus reducing the diameter of the beam of light or radiation finally entering or exiting from the fiber endpiece 40. Accordingly, proper alignment and positioning of the fiber endpiece may be very critical, which is the reason why, conventionally, often additional substrate or substrate-like structural elements are needed to be formed and arranged on the mounting substrate 2 (in addition to the optoelectronic substrate 10) in order to at least partially align the fiber endpiece with regard to least along some directions and/or orientation angles. Additional structural elements having exposed surfaces intended to abut against which the fiber endpiece are conventionally used for fiber alignment. Such conventional devices and methods, however, require aligned mounting of all these additional structural elements. The application, instead, teaches devices and methods obviating the need for forming and arranging such additional structural elements, thereby significantly reducing the effort and costs for forming the components of the optoelectronic device.

As further depicted in FIG. 13, the gripper 60 comprises at least one air suction tube 61 (ending at the corresponding air suction hole 62 at or near the bottom end of the gripping element) through which the fiber is sucked and thereby gripped using subatmospheric pressure. Furthermore, both camera systems 70 may be moved along with the at least one gripper 60 or independently from it. Moreover, camera systems 71, 72 may be moved independently from each other. Although both options are possible, in the case that the mirror 75 is attached to at least one gripper 60, so that the camera systems 70 as well as and the gripper 60 are moved as a unit.

According to one monitoring technique, the optical systems and especially the camera systems 70 are first positioned such that the coupling region of the optoelectronic device appears sharply in the image sensor or display of the cameras. Subsequently, with each camera a video image or photo of the coupling region 15 is shot which may be stored. Via imaging processing, the position of the coupling region 15 or active area in the three-dimensional space is calculated, for instance relatively to the mounting substrate 2. At this time, the fiber endpiece may be arranged sufficiently distant from the optoelectronic substrate 10 that the coupling region 15 is not hidden from view by the fiber endpiece 40 or by the gripper. Subsequently, the fiber endpiece is positioned such that the contour of fiber appears at a predefined position in the respective two-dimensional image of each camera in such a way that, firstly, at least the fiber endpiece of the fiber is cantered, with regard to the coupling region 15, along the lateral directions x, y of the coupling region 15 oriented upright above the mounting surface 2A, and that, secondly and at the same time, the distance between the coupling region and the fiber endpiece, particularly of its outermost portion along the axial direction a, correspond to a predefined distance along the vertical direction z. This direction usually corresponds to the normal direction n of the coupling region 15. By the use of at least two camera systems 71, 72, positioning and alignment of the optical fiber along all three directions in the three-dimensional space x, y, z is easily possible.

In case the optical system is maintained at a fixed position relative to the mounting surface 2A and the optoelectronic substrate 10, the captured images of the coupling region 15 will not shift over time. This allows predefining the desired position of the image of the fiber endpiece 40 in both images. If, however, the video camera systems 70 are moved after capturing the images of the coupling region 15, for comparison with further images captured later the position of the coupling region 15 in these further images has to be evaluated again relative to further locations or image points in the image. Finally, the fiber endpiece has to be aligned relative to these further locations.

Figure 15:
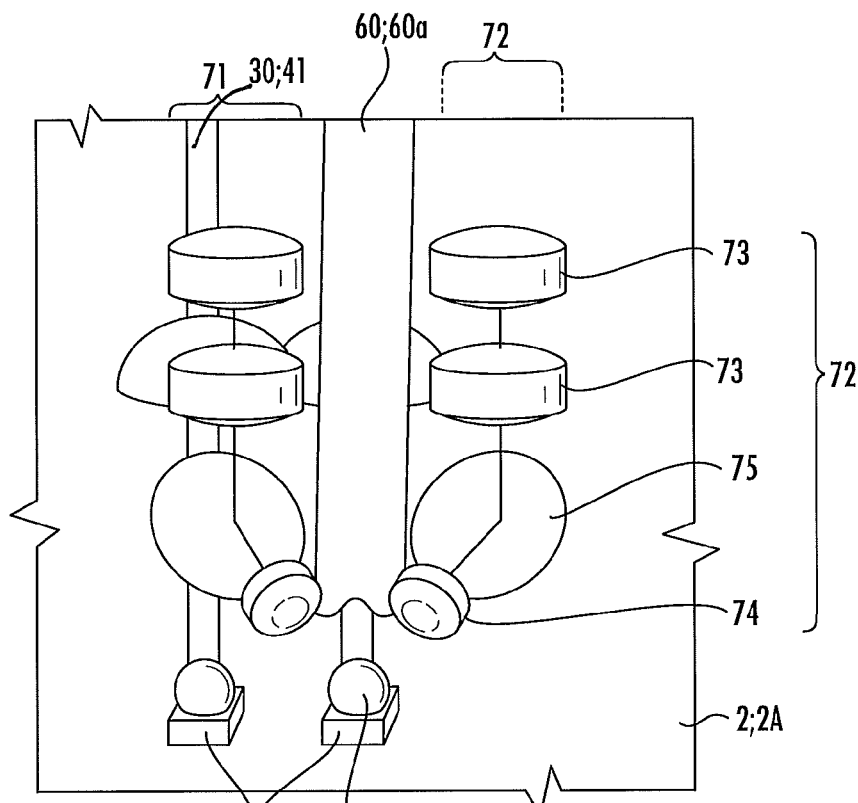
FIG. 15 is a perspective view, related to the method of FIGS. 13 and 14, from above the axial direction of the optical fiber.
Figure 16:
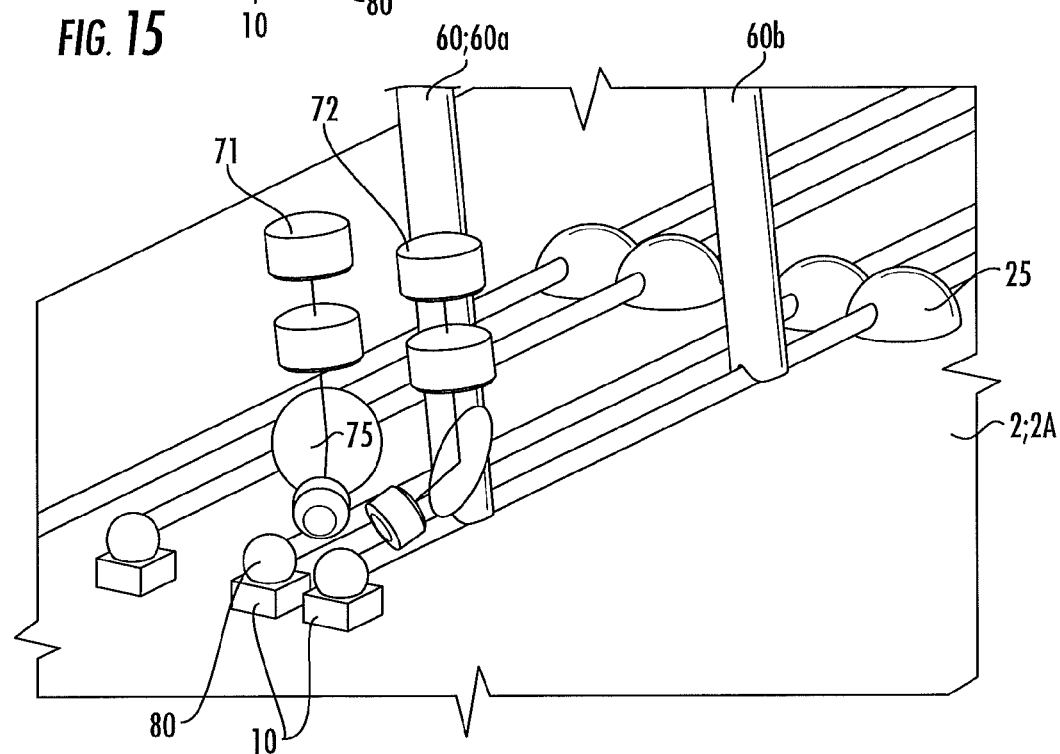
FIG. 16 is another perspective view, related to FIGS. 14 and 15, from another direction diagonally to the axial direction of fiber.

FIGS. 15 and 16 illustrate a step of the method of assembling the optoelectronic device, namely the step of guiding and thereby aligning the optical fiber. For this step, to FIGS. 15 and 16 show monitoring equipment having very compact dimensions and a short monitoring distance, particularly between the at least one camera system 71, 72 and the coupling region 15 of the optoelectronic substrate 10 to be monitored. FIG. 15 shows a perspective view from a direction roughly diagonal in the x-z-plane in which two fibers 30 are shown, one of them being guided or otherwise moved so as to achieve alignment with regard to the coupling region 15. If an adhesive 80 is already applied (as for instance illustrated in FIG. 10, 11, 15 or 16), it will not be cured or hardened completely until the alignment procedure is finished. According to FIG. 15, each of the two camera systems 71, 72 comprises, in addition to the respective camera (not illustrated), one or plural lenses 73, 74 and, an optional mirror 75 reflecting the path of light within or in front of each camera system. Accordingly, at least part of the camera system, such as the lenses 73, may be oriented vertically and, optionally, may be connected to at least one gripper 60a.

As shown in FIG. 16, further grippers 60b may be used. However, the camera systems 71, 72 may be attached to that gripper 60a which is located closest to the fiber endpiece 40 or the optoelectronic substrate 10. The further grippers 60b may be moved in the same way as the first gripper 60a at any time. However, according to another embodiment, some or each of the grippers 60a, 60b may be moved separately from the other ones, in particular for the sake of creating an intentional, predefined deviation of the first fiber section 41 from the normal direction n of the coupling region 15, such as a local curvature or bending of the first fiber section 41. As explained above, a partial retraction of the fiber endpiece 40 and/or additional margin of the first fiber section 41 may be provided thereby in case of mechanical stress occurring due to thermal expansion of the mounting substrate 2 when the optoelectronic device 1 is in use.

Whereas in FIGS. 15 and 16 the optical systems, that is the camera systems 71, 72, mirrors 75 and/or lenses 73, 74 are arranged such that the fiber endpiece 40 and/or the coupling region 15 is monitored from positions arranged within the axial extension of the optical fiber, alternatively the optical systems may be arranged such that the fiber endpiece 40 and/or the coupling region 15 is monitored from positions arranged outside or beyond the axial extension of the optical fiber, for instance from the positions illustrated in FIGS. 13 and 14. Thereby, perspective views from directions deviating from the normal direction of the reflective surface 46 by less than 45° can be captured by means of the camera systems 71, 72. Accordingly, also in FIGS. 15 and 16 the camera systems may be oriented this way so as to provide a more top-view-like look onto the reflective surface 46. Nonetheless, the camera systems 71, 72 may be connected to and moved with the gripper 60a as a unit.

The method of any of FIGS. 9 to 16 may comprise the steps of (a) mounting at least one optoelectronic substrate 10 on a mounting surface 2A of a mounting substrate 2, the optoelectronic substrate 10 comprising at least one optoelectronic element 20, the optoelectronic substrate 10 having at least one coupling region 15 for emitting or detecting electromagnetic radiation to or from an optical fiber and further having a support surface 12, the coupling region 15 being parallel to the support surface 12; wherein the at least one optoelectronic substrate 10 is mounted, with its support surface 12, to the mounting surface 2A of the mounting substrate 2; and (b) assembling an optoelectronic device 1 by mounting at least one optical fiber 30, including the steps of: b)i) coupling at least one fiber endpiece 40 of an optical fiber 30 to the at least one coupling region 15 of the optoelectronic substrate 10; and b)ii) securing at least one fiber portion 42, 44 of the optical fiber 30 arranged at a respective distance d1, d2 from the fiber endpiece 40 in a fixed position relative to the mounting surface 2A of the mounting substrate 2 by means of at least one glue droplet 25, 26, wherein the at least one fiber portion 42, 44 is brought into contact with and/or immersed in the respective glue droplet 25, 26.

The method of any of FIGS. 9 to 16 may be executed according to any of claims 11 to 15. Furthermore, before performing step b)i) and/or step b)ii), a step of cleaving the fiber endpiece and/or a step of uncoating the optical fiber may performed. These steps or one of them may be executed automatedly, for instance by a constructional unit comprising the at least one gripper 60. Thereby, cleaving, uncoating and gripping the optical fiber 30 may be performed with a high degree of automation and thus more efficiently. Regarding the uncoating step, the fiber endpiece 40 or some of the elements from the group of the fiber endpiece 40, the first fiber section 41, the first fiber region 42, the second fiber section 43 and/or a second fiber portion 44 may be uncoated. The cleaving step and/or the uncoating step may be performed during or before the fiber endpiece 40 and/or a fiber section 41 between the fiber endpiece 40 and the at least one fiber portion 42, 44 is guided, moved or otherwise aligned with respect to the coupling region 15 of the optoelectronic substrate 10 or with respect to the glue droplet, respectively.

The method of any of FIGS. 9 to 16 may be executed according to any of claims 11 to 15. Furthermore, before performing step b)i) and/or step b)ii), a step of cleaving the fiber endpiece and/or a step of uncoating the optical fiber may performed. These steps or one of them may be executed automatedly, for instance by a constructional unit comprising the at least one gripper 60. Thereby, cleaving, uncoating and gripping the optical fiber 30 may be performed with a high degree of automation and thus more efficiently. Regarding the uncoating step, the fiber endpiece 40 or some of the elements from the group of the fiber endpiece 40, the first fiber section 41, the first fiber region 42, the second fiber section 43 and/or a second fiber portion 44 may be uncoated. The cleaving step and/or the uncoating step may be performed during or before the fiber endpiece 40 and/or a fiber section 41 between the fiber endpiece 40 and the at least one fiber portion 42, 44 is guided, moved or otherwise aligned with respect to the coupling region 15 of the optoelectronic substrate 10 or with respect to the glue droplet, respectively.

Furthermore, whereas in FIGS. 9 to 16 the alignment is measured be monitoring the position of the fiber endpiece 40 and of the coupling region 15 relative to one another, alternatively the proper fiber alignment can be obtained by monitoring, that is measuring the coupling efficiency, that is the amount or fraction of electromagnetic radiation transferred between the coupling region 15 and the optical fiber 30, depending of the position of the fiber endpiece 40. The optical fiber 30 and/or its fiber endpiece 40 is then positioned at the position allowing maximum coupling efficiency, that is maximum amount or intensity of radiation transferred.

Figure 17A:
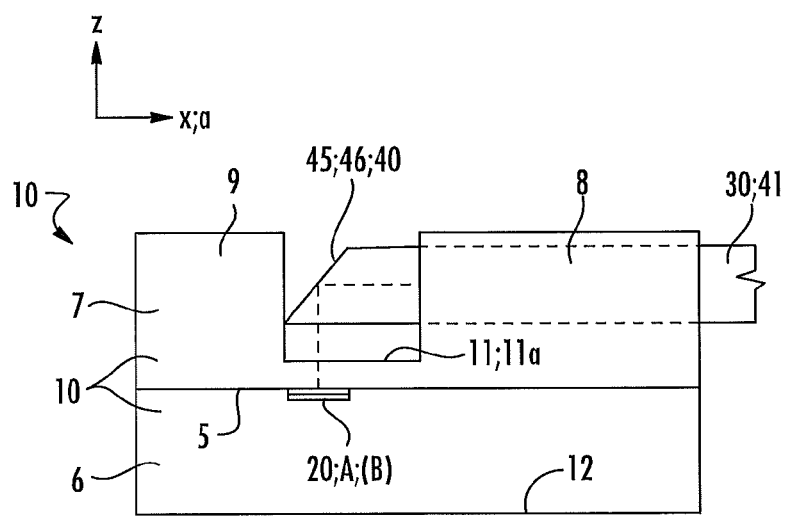
FIG. 17A and 17B are cross-sectional views of embodiments of an optoelectronic device having an optoelectronic substrate being a compound substrate.
Figure 17B:
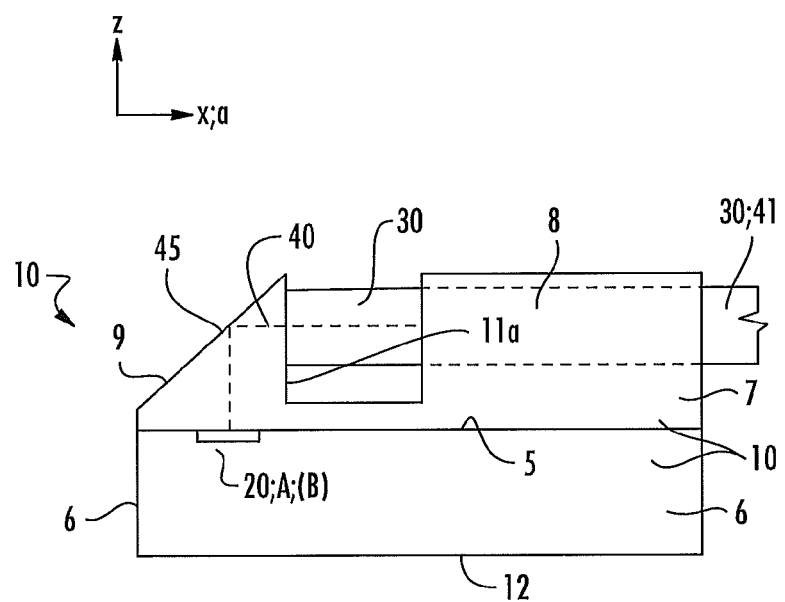

FIG. 17A and 17B show embodiments of the at least one optoelectronic substrate 10 of the optoelectronic device 1. The optoelectronic substrate 10 according to FIG. 17A is a compound substrate comprising a first substrate 6 containing the at least one optoelectronic element 20 and further comprising a fiber endpiece mounting block 7 shaped to receive at least one fiber endpiece 40 of an optical fiber 30 in an at least partially predefined mounting position. The endpiece mounting block 7 thus serves to provide self-alignment of the mounting position along one or more directions and/or orientation angles. The first substrate 6 and the fiber endpiece mounting block 7, as a unit forming a chip or diced wafer piece, are an integral piece of the compound substrate representing the optoelectronic substrate 10. Accordingly, the coupling region 15, that is the active area surface actually emitting or detecting the electromagnetic radiation, does not need to be an exterior surface portion of the fiber endpiece mounting block 7 or of the optoelectronic substrate 10; instead it may be arranged inside the optoelectronic substrate 10. Accordingly, there may be a passing surface 11a through which the light travels; the passing surface 11a being different from the coupling region 15 and/or being placed at another position than the coupling region 15, for instance vertically or both vertically and horizontally offset relative to the coupling region 15. Accordingly, whereas the passing surface 11a may be a mechanical coupling region of the integral compound substrate (as in FIG. 17B) and/or at least an exterior surface through which the electromagnetic radiation travels, the coupling region 15 may be located elsewhere. For instance, the coupling region 15, that is the active area for emitting or detecting the electromagnetic radiation, may be a portion of an interface surface 5 arranged inside the compound substrate. Furthermore, the interface surface 5 and/or the coupling region 15 for emitting or detecting the electromagnetic radiation may be oriented parallel or coplanar to the mounting surface 2A. The fiber endpiece mounting block 7 may however comprise the reflective element 45, that is an internally reflecting surface (inclined by about 45°, for instance, as depicted in FIG. 17B) for deflecting the beam of radiation by 90°.

As apparent from FIGS. 17A and 17B, the application may take advantage of wafer-level production methods, for instance by using integral compound substrates comprising both a chip or wafer piece in and/or on which the optoelectronic element 20 is provided as well as a fiber endpiece mounting block 7 usable for partially pre-aligning the mounting position of the fiber endpiece 40.

As apparent from FIG. 17A and 17B, the optoelectronic substrate 10 is a compound substrate comprising a first substrate 6, which corresponds to and may comprise any feature or combination of features of the optoelectronic substrate 10 of any of the FIGS. 1 to 16, and further comprises a fiber endpiece mounting block 7 arranged on a top surface of the first substrate 6; the top surface thus being a boundary surface 5 or interface surface between the components 6, 7 of the compound substrate 10. The compound substrate or optoelectronic element 10 can be an integrated compound substrate resulting from wafer-level processing, as for instance applied in semiconductor manufacturing; in particular in wafer-level manufacturing of optoelectronic devices. The compound substrate thus may be a chip or wafer piece comprising sidewalls resulting from dicing a compound wafer on which two substrates, or at least a substrate and a layer patterned to comprise a plurality of fiber endpiece mounting blocks 7 is included. Accordingly, the fiber endpiece mounting block 7 is an integrated part of the optoelectronic substrate 10 being connected with the first substrate 6 so as to constitute a one-piece compound chip. In addition, a feature of the one-piece compound chip formed based on wafer-level production is apparent from the sidewalls which extend substantially perpendicular to the support surface 12, to the boundary surface 5 and/or to the coupling region 15. Thanks to wafer-level production, the sidewalls of the first substrate 6 and the sidewalls of the fiber endpiece mounting block 7 are thus flush with one another, without the need for any a posteriori alignment. The compound substrate 10 is readily mountable, via its mounting surface 12, on the mounting surface 2A of the optoelectronic substrate as in any of the FIGS. 1 to 16 or any other embodiment of the application.

According to FIG. 17A, the fiber endpiece mounting block 7 comprises a fiber positioning end stop portion 9 against which the fiber endpiece 40 will abut with the tapered portion at the end of the reflective element 45 or reflective fiber surface 46 which may be designed according to any of FIGS. 1 to 8, for instance; thus the axial or longitudinal fiber position along the axial direction a of the fiber is automatically predefined and self-aligned. Additionally and/or alternatively, the fiber endpiece mounting block 7 may comprise an integrated fiber guidance block portion 8 which, for instance, may comprise a recess (like a V-shaped, U-shaped or otherwise shaped recess or tube) which substantially extends along the axial direction a or first lateral direction x and serves to guide and orient a part of the first fiber section 41 close to the fiber endpiece 40 along the desired direction x. The integrated elements 8, 9 of the fiber endpiece mounting block 7 allow self-aligned or partially self-aligned fiber coupling, thereby at least partially reducing the effort of fiber alignment.

FIG. 17B shows another exemplary embodiment to FIGS. 1 to 17A illustrating that the reflective element 45 does not necessarily need to form part of the fiber endpiece. Instead, the reflective element 45 may be included in the optoelectronic substrate 10, such as in the compound substrate. In particular, the reflective element 45 may be comprised in the fiber endpiece mounting block 7 and may form part of the fiber positioning end stop portion 9. Accordingly, no specially designed, tapered or otherwise treated fiber endpiece is required; the fiber endpiece may instead be concentric or simply cleaved in direction normal to the axial extension of the fiber.

As apparent from FIGS. 17A and 17B, the fiber endpiece does not need not face or point at the coupling region 15 or be at the same lateral position, relative to the mounting surface 2A, as the coupling region 15. Instead, the exposed surface such as the passing surface 11a of the optoelectronic substrate 10 may be different from the coupling region 15, which for instance is arranged at a boundary surface 15 or closely beneath it. In particular, the contact surface or passing surface 11a for mechanical contact with the fiber endpiece, if any, may be an exposed surface of the first substrate 6 or of the fiber endpiece mounting block 7. As further apparent from FIGS. 17A and 17B, the exposed surface contacting the fiber endpiece 40 may have an orientation different from the orientation of the coupling region 15; in particular the orientation of the contact surface and/or of the passing surface 11a may be perpendicular, that is orthogonal to the orientation of the coupling region 15 and/or of the boundary surface 5. However, the height of the passing surface 11a above, that is distance from the mounting surface 2A of the mounting substrate 2, may correspond to the mounting distance D of the fiber endpiece 40, but is larger than the distance between the position p or height of the coupling region 15 of the optoelectronic substrate 10 and the mounting surface 2A. Accordingly, also in FIGS. 17A and 17B the fiber is mountable at a larger distance from the mounting substrate 2 than the coupling region 15. As apparent from FIGS. 1 to 17B, the lateral position and/or extension of the fiber endpiece 40 may be comprised in or may at least overlap with the lateral position and/or extension of the optoelectronic substrate 10 with regard to the mounting surface 2A of the optoelectronic substrate 10. Furthermore, as apparent from FIGS. 1 to 17A, the lateral position and/or extension of the fiber endpiece 40 may correspond to or overlap with the lateral extension and/or position of the optoelectronic element 20, particularly with the position of the optoelectronically active layers A, B and/or of the coupling region 15. Alternatively, as apparent from FIG. 17B, for instance, the lateral position and/or extension of the fiber endpiece 40, in particular of its endpiece surface, may be different from and particularly offset along the axial direction a with respect to the lateral position and/or extension of the optoelectronic element 20 or coupling region.

Figure 18:
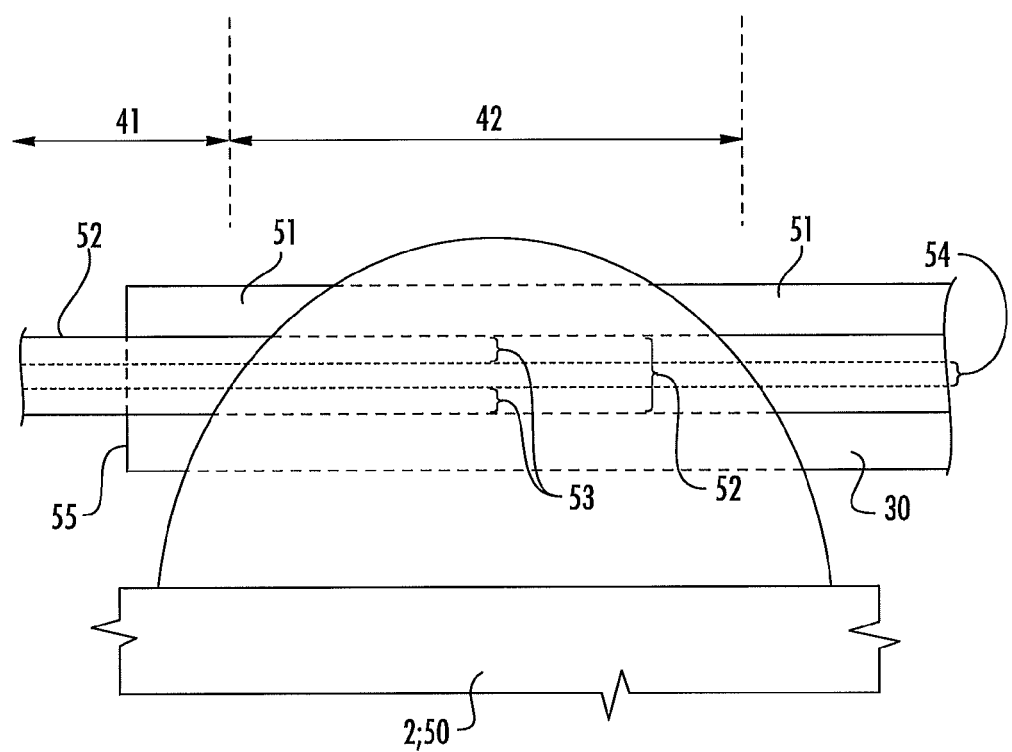
FIG. 18 is a partial view of an optoelectronic device showing a fiber being coated at the glue droplet.

FIG. 18 is a partial view of an optoelectronic device, which shows a detail regarding the optical fiber 30, particularly at its fiber portion 42 arranged inside the glue droplet 25. The glue droplet 25 may be arranged on the surface of the mounting substrate 2 or, likewise, on a surface of a support block 50. Generally, as shown to FIG. 18 in detail, the optical fiber 30 may be a coated fiber. The fiber coating 51 may encapsulate the radiation-transmissive material 52 of the optical fiber, which radiation-transmissive material 52 may comprise a fiber core 54 as well as a fiber cladding 53 around the fiber core 54.

According to FIG. 18, the fiber coating 51 may surround the first fiber portion 42 and may thus contact the material of the glue droplet directly. Furthermore, the fiber coating 51 may additionally surround at least a part of the first fiber section 41. Accordingly, along the axial direction of the optical fiber 30, a coating endface 55 of the coating 51 may be located in a position between the first fiber portion 42 and the fiber endpiece 40. The coating endface 55 is thus positioned, along the axial fiber direction, at and around the first fiber section 41. The fiber endpiece 40, however, may be uncoated.

The fiber coating as shown in FIG. 18 may additionally be present in any of FIGS. 1 to 17b. Particularly the fibers shown in FIGS. 1, 2, 7 and 8 may comprise a coating as illustrated in FIG. 18 and may thus contact, with their fiber coating 51, the glue droplet 25. The fiber coating around the optical fiber 30 and/or forming part of the optical fiber 30 may further be combined with any other embodiment of the application.

What is claimed is:

1. An optoelectronic device comprising:
   a mounting substrate having a mounting surface;
   at least one optoelectronic substrate comprising:
      a support surface, the optoelectronic substrate with its support surface being mounted at and supported by the mounting surface of the mounting substrate; and
      at least one optoelectronic element with a coupling region for emitting or detecting electromagnetic radiation, the coupling region being oriented parallel to the support surface and/or to the mounting surface;
   at least one optical fiber having a fiber endpiece;
   at least one reflective element for reflecting electromagnetic radiation entering or exiting the at least one optical fiber; and
   at least one glue droplet in a position fixed relative to the mounting surface of the mounting substrate, the at least one glue droplet being made of a glue material or of another adhesive material;
   wherein each optical fiber comprises at least one fiber portion contacting and/or being immersed in the at least one glue droplet, the fiber portion being arranged at a distance from the fiber endpiece of the optical fiber;
   wherein the fiber endpiece is secured to the coupling region of the at least one optoelectronic element such that the fiber endpiece is arranged at a mounting distance from the mounting surface being larger than a distance between a position of the coupling region of the optoelectronic substrate and the mounting surface;

wherein the at least one optical fiber comprises a fiber section arranged between the first end piece and the fiber portion, and the fiber section comprises a bend; and wherein the mounting surface, with the exception of portions of the mounting surface underlying and supporting the at least one glue droplet and/or the at least one optoelectronic substrate, is exposed around the at least one optoelectronic substrate and/or the at least one glue droplet.

2. The optoelectronic device of claim 1, wherein the fiber endpiece is arranged, at the mounting distance from the mounting surface, above a portion of the mounting surface covered with the optoelectronic substrate.

3. The optoelectronic device of claim 1, wherein the coupling region is an outer top surface of the optoelectronic substrate facing away from the mounting substrate.

4. The optoelectronic device of claim 1, wherein the coupling region is a boundary surface of a stack of optoelectronic active layers stacked, on or in the optoelectronic substrate, on one another and designed for emission or detection of electromagnetic radiation mainly along their common normal direction perpendicularly through the coupling region.

5. The optoelectronic device of claim 1, wherein each glue droplet is supported by the mounting surface of the mounting substrate via a support block forming a pedestal, the glue droplet being glued onto the support block and the support block being mounted to the mounting surface.

6. The optoelectronic device of claim 1, wherein the at least one optoelectronic substrate is an integral piece of compound substrate comprising a first substrate and a fiber endpiece mounting block connected to the first substrate, wherein the at least one optoelectronic element is formed in the first substrate and wherein the fiber endpiece is engaging with the fiber endpiece mounting block at the mounting distance.

7. The optoelectronic device of claim 6, wherein the at least one reflective element forms part of the fiber endpiece mounting block of the compound substrate, the reflective element having a main orientation inclined by between 45° and 55° relative to the axial direction of the optical fiber engaging or covering the fiber endpiece mounting block.

8. The optoelectronic device of claim 1, wherein the at least one reflective element comprises a reflective fiber surface at the fiber endpiece having a main orientation inclined by between 45° and 55° relative to the axial direction of the optical fiber.

9. The optoelectronic device of claim 1, wherein the mounting substrate comprises at least one recess having a recessed and/or inclined bottom surface on which the optoelectronic substrate is mounted, the direction of propagation of electromagnetic radiation emitted or detected by the optoelectronic element being tilted, due to the orientation of the bottom surface of the recess, by an angle of less than 10° with respect to the normal direction of the mounting surface.

10. The optoelectronic device of claim 1, wherein the fiber endpiece is supported, by means of a glue droplet closest to the fiber endpiece, in a mechanically non-contacting position corresponding to the aligned coupling position, the fiber endpiece being exposed to the air or ambient atmosphere without mechanical contact to the optoelectronic substrate and/or to any other mounting means.

11. A method of assembling an optoelectronic device, the method comprising:
a) mounting at least one optoelectronic substrate on a mounting surface of a mounting substrate, the optoelectronic substrate comprising at least one optoelectronic element, the optoelectronic substrate having at least one coupling region for emitting or detecting electromagnetic radiation to or from an optical fiber and further having a support surface, the coupling region being parallel to the support surface, wherein the at least one optoelectronic substrate is mounted, with its support surface, to the mounting surface of the mounting substrate; and b) assembling an optoelectronic device by mounting at least one optical fiber, including the steps of:
  i) securing at least one fiber portion of the optical fiber arranged at a respective distance from the fiber endpiece in a fixed position relative to the mounting surface of the mounting substrate by means of at least one glue droplet, wherein the at least one fiber portion is brought into contact with and/or immersed in the respective glue droplet; and
  ii) coupling at least one fiber endpiece of an optical fiber to the at least one coupling region of the optoelectronic substrate wherein, after performing step b)ii), the fiber endpiece is retracted from the coupling region by bringing at least a first fiber section arranged between the fiber endpiece and a first fiber portion in a bending position so as to increase a margin of the optical fiber near the fiber endpiece against tensional stress.

12. The method of claim 11, wherein step i) includes guiding the fiber endpiece and/or a fiber section between the fiber endpiece and the at least one fiber portion, thereby positioning the fiber endpiece in an aligned coupling position with respect to the coupling region, wherein the aligned coupling position corresponding to a mounting distance from the mounting surface being larger than the position of the coupling region of the optoelectronic substrate along the normal direction of the mounting surface.

13. The method of claim 11, wherein step ii) includes picking up each optical fiber by means of a gripper or a set of grippers to position the at least one optical fiber in the aligned coupling position.

14. An optoelectronic device comprising:
a mounting substrate comprising a mounting surface and a recess within the mounting surface, the recess comprising a bottom surface that is tilted relative to a surrounding portion of the mounting surface;
at least one optoelectronic substrate comprising:
  a support surface mounted at the bottom surface of the recess within the mounting substrate; and
  at least one optoelectronic element with a coupling region for emitting or detecting electromagnetic radiation, the coupling region being oriented parallel to the support surface and/or to the mounting surface, wherein a direction of propagation of electromagnetic radiation emitted or detected by the optoelectronic element is tilted by an angle greater than 0° and less than 10° with respect to a direction normal to the mounting surface;
at least one optical fiber having a fiber endpiece;
at least one reflective element for reflecting electromagnetic radiation entering or exiting the at least one optical fiber; and
at least one glue droplet in a position fixed relative to the mounting surface of the mounting substrate, the at least one glue droplet being made of a glue material or of another adhesive material;
wherein each optical fiber comprises at least one fiber portion contacting and/or being immersed in the at least one glue droplet, the fiber portion being arranged at a distance from the fiber endpiece of the optical fiber; and wherein the fiber endpiece is arranged at a mounting distance from the mounting surface being larger than a distance between a position of the coupling region of the optoelectronic substrate and the mounting surface.

15. The optoelectronic device of claim 14, wherein the fiber endpiece is arranged, at the mounting distance from the mounting surface, above a portion of the mounting surface covered with the optoelectronic substrate.

16. The optoelectronic device of claim 14, wherein the coupling region is a boundary surface of a stack of optoelectronically active layers stacked, on or in the optoelectronic substrate, on one another and designed for emission or detection of electromagnetic radiation mainly along their common normal direction perpendicularly through the coupling region.

17. The optoelectronic device of claim 14, wherein each glue droplet is supported by the mounting surface of the mounting substrate via a support block forming a pedestal, the glue droplet being glued onto the support block and the support block being mounted to the mounting surface.

18. The optoelectronic device of claim 14, wherein the at least one optoelectronic substrate is an integral piece of compound substrate comprising a first substrate and a fiber endpiece mounting block connected to the first substrate, wherein the at least one optoelectronic element is formed in the first substrate and wherein the fiber endpiece is engaging with the fiber endpiece mounting block at the mounting distance.

19. The optoelectronic device of claim 14, wherein the at least one reflective element comprises a reflective fiber surface at the fiber endpiece having a main orientation inclined by between 45° and 55° relative to the axial direction of the optical fiber.

20. The optoelectronic device of claim 14, wherein the fiber endpiece is supported, by means of a glue droplet closest to the fiber endpiece, in a mechanically non-contacting position corresponding to the aligned coupling position, the fiber endpiece being exposed to the air or ambient atmosphere without mechanical contact to the optoelectronic substrate and/or to any other mounting means.

* * * * *